(12) United States Patent
Oringer

(10) Patent No.: US 11,068,530 B1
(45) Date of Patent: Jul. 20, 2021

(54) CONTEXT-BASED IMAGE SELECTION FOR ELECTRONIC MEDIA

(71) Applicant: Shutterstock, Inc., New York, NY (US)

(72) Inventor: Jonathan Oringer, New York, NY (US)

(73) Assignee: Shutterstock, Inc., New York, NY (US)

( * ) Notice: Subject to any disclaimer, the term of this patent is extended or adjusted under 35 U.S.C. 154(b) by 124 days.

(21) Appl. No.: 16/179,686

(22) Filed: Nov. 2, 2018

(51) Int. Cl.
| | |
|---|---|
| *G06Q 30/00* | (2012.01) |
| *G06F 16/532* | (2019.01) |
| *G06Q 30/02* | (2012.01) |
| *H04L 29/08* | (2006.01) |
| *G06N 20/00* | (2019.01) |
| *G06F 40/134* | (2020.01) |

(52) U.S. Cl.
CPC .......... *G06F 16/532* (2019.01); *G06F 40/134* (2020.01); *G06N 20/00* (2019.01); *G06Q 30/0277* (2013.01); *H04L 67/20* (2013.01); *H04L 67/22* (2013.01)

(58) Field of Classification Search
CPC ..... G06F 16/532; G06F 40/134; G06N 20/00; G06Q 30/0277; H04L 67/20; H04L 67/22
USPC ...................................................... 705/14.73
See application file for complete search history.

(56) References Cited

U.S. PATENT DOCUMENTS

| | | | | |
|---|---|---|---|---|
| 5,534,917 A * | 7/1996 | MacDougall | ........... | G06F 3/011 348/169 |
| 7,058,204 B2 * | 6/2006 | Hildreth | ............. | G06K 9/00375 382/103 |
| 7,227,526 B2 * | 6/2007 | Hildreth | ............. | G06K 9/00375 345/156 |
| 7,379,566 B2 * | 5/2008 | Hildreth | ................ | G06F 1/1626 348/208.1 |
| 7,389,591 B2 * | 6/2008 | Jaiswal | ................ | G06F 1/1626 33/366.11 |
| 8,631,358 B2 * | 1/2014 | Louch | ............... | H04M 1/72544 715/866 |
| 9,299,092 B1 * | 3/2016 | Brown | ............... | G06Q 30/0275 |
| 9,983,687 B1 * | 5/2018 | Forsblom | ................ | G06F 3/017 |

(Continued)

OTHER PUBLICATIONS

Everyday life as a text soft control, television, and Twitter, Lahey, Sage, 2016.*

*Primary Examiner* — Azam A Ansari
*Assistant Examiner* — Michael I Ezewoko
(74) *Attorney, Agent, or Firm* — McDermott Will & Emery LLP

(57) ABSTRACT

Various aspects of the subject technology relate to systems, methods, and machine-readable media for context-based selection of images for digital media. An image server storing many images provides, in real time as digital media are rendered, images for inclusion in that digital media that will drive client engagement goals for that media. The digital media may include a web page of a business and the engagement goal may be increasing time-on-site for a user of that web page. The digital media may include a customer email and the engagement goal may be a user opening the email or following a link in the email. The image server includes a machine-learning engine to identify recommended images for each instance of the web page, email, or other digital media for a particular user at a particular time.

24 Claims, 20 Drawing Sheets

(56) References Cited

U.S. PATENT DOCUMENTS

| | | | |
|---|---|---|---|
| 10,163,227 B1* | 12/2018 | Lester | G06T 9/002 |
| 10,176,484 B2* | 1/2019 | Dilling | G06Q 30/0275 |
| 10,242,388 B2* | 3/2019 | Shen | G06Q 30/0277 |
| 10,276,189 B1* | 4/2019 | Brochu | G06K 9/00765 |
| 10,437,878 B2* | 10/2019 | Ranzinger | G06K 9/4604 |
| 10,445,431 B1* | 10/2019 | Lev-Tov | G06F 40/40 |
| 10,459,975 B1* | 10/2019 | Malpani | G06F 16/71 |
| 10,503,775 B1* | 12/2019 | Ranzinger | G06K 9/6202 |
| 10,552,478 B1* | 2/2020 | Lev-Tov | G06F 16/248 |
| 10,621,137 B2* | 4/2020 | Chavez | H04L 29/06 |
| 10,621,755 B1* | 4/2020 | Lester | H04N 19/85 |
| 10,685,057 B1* | 6/2020 | Chavez | G06N 7/005 |
| 10,771,867 B1* | 9/2020 | Chemolosov | G06F 16/743 |
| 10,789,288 B1* | 9/2020 | Ranzinger | G06K 9/6215 |
| 2005/0238201 A1* | 10/2005 | Shamaie | G06K 9/00355 |
| | | | 382/103 |
| 2007/0090180 A1* | 4/2007 | Griffis | G06Q 10/06 |
| | | | 235/376 |
| 2007/0136132 A1* | 6/2007 | Weiser | H04W 4/023 |
| | | | 705/14.64 |
| 2008/0147493 A1* | 6/2008 | Aarnio | H04M 3/4878 |
| | | | 705/14.64 |
| 2009/0029720 A1* | 1/2009 | Jaffe | G06Q 30/02 |
| | | | 455/456.3 |
| 2009/0157341 A1* | 6/2009 | Cheung | E21B 47/022 |
| | | | 702/85 |
| 2009/0184849 A1* | 7/2009 | Nasiri | A63F 13/211 |
| | | | 341/20 |
| 2009/0319166 A1* | 12/2009 | Khosravy | G06Q 30/0229 |
| | | | 701/532 |
| 2010/0114562 A1* | 5/2010 | Hutchinson | G06F 40/131 |
| | | | 704/9 |
| 2010/0257475 A1* | 10/2010 | Smith | H04N 21/485 |
| | | | 715/771 |
| 2010/0269030 A1* | 10/2010 | Dugonjic | G06Q 30/02 |
| | | | 715/207 |
| 2011/0173204 A1* | 7/2011 | Murillo | A63F 13/428 |
| | | | 707/741 |
| 2011/0191024 A1* | 8/2011 | DeLuca | G01C 21/28 |
| | | | 701/472 |
| 2011/0238308 A1* | 9/2011 | Miller | G01S 19/31 |
| | | | 701/472 |
| 2011/0270679 A1* | 11/2011 | Tziortzis | G06Q 30/02 |
| | | | 705/14.58 |
| 2011/0288913 A1* | 11/2011 | Waylonis | G06Q 30/0241 |
| | | | 705/14.4 |
| 2012/0036003 A1* | 2/2012 | Tong | G06Q 30/0207 |
| | | | 705/14.39 |
| 2012/0041767 A1* | 2/2012 | Hoffman | G07C 1/22 |
| | | | 705/1.1 |
| 2012/0131454 A1* | 5/2012 | Shah | G06F 3/0481 |
| | | | 715/702 |
| 2012/0246596 A1* | 9/2012 | Ording | G06F 3/0481 |
| | | | 715/799 |
| 2012/0265595 A1* | 10/2012 | Corner | H04W 4/21 |
| | | | 705/14.23 |
| 2012/0310717 A1* | 12/2012 | Kankainen | G06Q 30/02 |
| | | | 705/14.4 |
| 2013/0102330 A1* | 4/2013 | Lee | H04W 4/21 |
| | | | 455/456.3 |
| 2013/0166397 A1* | 6/2013 | Byun | G06Q 30/0277 |
| | | | 705/14.73 |
| 2013/0166398 A1* | 6/2013 | Minde | G06Q 20/387 |
| | | | 705/16 |
| 2013/0211923 A1* | 8/2013 | Yuill | G06Q 30/0276 |
| | | | 705/14.72 |
| 2013/0211924 A1* | 8/2013 | Yuill | G06Q 30/0277 |
| | | | 705/14.72 |
| 2013/0218680 A1* | 8/2013 | Forsblom | G06Q 30/0261 |
| | | | 705/14.58 |
| 2014/0019254 A1* | 1/2014 | Reichert | G06Q 30/0267 |
| | | | 705/14.64 |
| 2014/0023087 A1* | 1/2014 | Czompo | G06F 3/00 |
| | | | 370/465 |
| 2014/0278853 A1* | 9/2014 | Brown | G06Q 30/0209 |
| | | | 705/14.12 |
| 2014/0280517 A1* | 9/2014 | White | H04L 67/22 |
| | | | 709/203 |
| 2014/0282088 A1* | 9/2014 | Kakani | G06F 3/0481 |
| | | | 715/753 |
| 2014/0288873 A1* | 9/2014 | Czompo | G01C 19/5776 |
| | | | 702/141 |
| 2014/0316884 A1* | 10/2014 | Munisamy | G06Q 30/0251 |
| | | | 705/14.49 |
| 2014/0344055 A1* | 11/2014 | Sanghavi | G06Q 30/0267 |
| | | | 705/14.55 |
| 2014/0352400 A1* | 12/2014 | Barrilado | G01P 15/0802 |
| | | | 73/1.38 |
| 2015/0046247 A1* | 2/2015 | Rajappa | G06Q 30/0235 |
| | | | 705/14.35 |
| 2015/0081448 A1* | 3/2015 | Osotio | G06Q 30/0269 |
| | | | 705/14.66 |
| 2015/0095160 A1* | 4/2015 | Ma | G06Q 30/0267 |
| | | | 705/14.64 |
| 2015/0120458 A1* | 4/2015 | Lee | G06Q 30/0209 |
| | | | 705/14.59 |
| 2015/0135284 A1* | 5/2015 | Bogard | G06F 21/35 |
| | | | 726/5 |
| 2015/0286279 A1* | 10/2015 | Lim | G06F 3/0346 |
| | | | 715/863 |
| 2016/0292742 A1* | 10/2016 | Kang | G06F 3/0485 |
| 2017/0286979 A1* | 10/2017 | Chavez | G06Q 20/04 |

* cited by examiner

CONTEXT-BASED IMAGE SELECTION FOR ELECTRONIC MEDIA

BACKGROUND

Field

The present disclosure generally relates to a computer-operated image retrieval system, and more particularly to context-based image selection for electronic media.

Description of the Related Art

Digital media such as web pages, emails, user interfaces for software applications, and the like often include images. The images that are included in the digital media are typically selected by a designer for permanent inclusion in all copies of that media. For example, the designer of a restaurant web page may select an image of a couple smiling and dining to be included in the web page every time the web page is loaded by all users. Similarly, a customer email that is sent to each of a list of customers of a company for advertising a sale often includes images associated with a product or a logo for the company.

However, it may be desirable to be able to provide improved image selection for digital media.

SUMMARY

The present disclosure provides a system for real-time selection and insertion of images into electronic, digital media such as web pages, emails, user interfaces, or the like. The system includes an image server that selects a recommended image for the digital media based on context for that media. The context may include an engagement goal (sometimes referred to herein as an engagement metric) for the image, such as a goal to keep the user at a website, to cause the user to click the image, to cause the user to purchase an item for sale, or other engagement goals as described herein. The context may also include information associated with the content of the digital media, information associated with a user of the digital media, and information associated with a client providing the digital media, and/or other context information as described herein.

The image server may provide the context information, including the engagement metric, to a machine-learning model that has been trained to identify and select a recommended image, from an image database storing hundreds, thousands, millions, or billions of images, that will drive that user, at that time, to that engagement goal (e.g., entice that user to click on the image while the image is displayed). The image server may also obtain feedback information regarding the effectiveness or efficiency of the selected recommended image at achieving the engagement goal, and may use that feedback information to further train the machine-learning model for future image selection and insertion operations. In this way, systems and methods are provided for automated, real-time image selection and insertion for digital media.

According to some aspects of the present disclosure, a computer-implemented method is provided. The method includes receiving, from a user device, an image request for an image that is associated with an engagement metric of a client that is unassociated with the user device. The method also includes identifying, with a machine-learning engine and based on the engagement metric of the client, a selected image from a plurality of images stored in an image database. The method also includes providing the selected image to the user device.

According to some aspects of the present disclosure, a computer-implemented method is provided. The method includes storing, in an image database, a plurality of images. The method also includes receiving a request from a client server for an image performance unit. The method also includes receiving one or more engagement metrics for the image performance unit from the client server. The method also includes generating an image link for the image performance unit. The method also includes generating a code snippet to provide the one or more engagement metrics to a machine-learning engine having access to information associated with the plurality of images, responsive to an engagement with the image link. The method also includes providing the image performance unit including the image link to the client server.

According to some aspects of the present disclosure, a computer-implemented method is provided. The method includes providing, from an image server having an image database storing a plurality of images, an image link for inclusion in an advertisement of a client. The method also includes receiving, at the image server, an image request for an image associated with the image link. The method also includes identifying, with a machine-learning engine at the image server and based on an engagement metric of the client, a selected image for the advertisement from the plurality of images. The method also includes providing the selected image.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
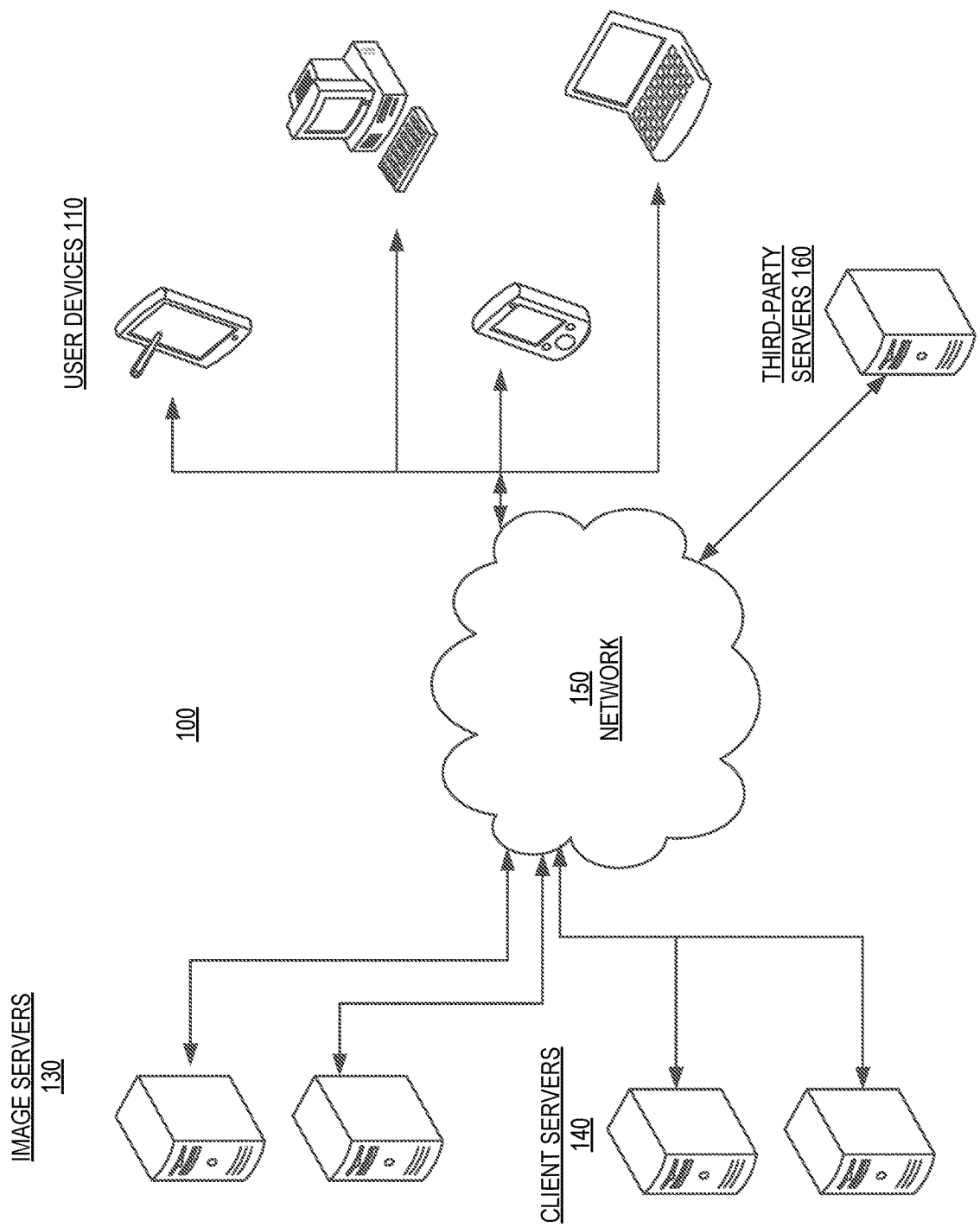
FIG. 1 illustrates an example architecture for context-based image selection for digital media suitable for practicing some implementations of the disclosure.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Developers of digital media such as web pages, emails such as customer emails, display advertisements, retargeting advertisements, or user interfaces for software applications may choose one or more images to include in the digital media. Images are often included for aesthetics by the media developer. Once an image has been selected, the image is commonly included in all instances of the digital media. For example, an image of a felled tree may be included in a web page for a tree-cutting business, every time any user loads the web page. In some circumstances, the web page may cycle through two or more images for variety when the web page is loaded. However, even with cycling of multiple images, opportunities for more targeted personalization of the images exist to increase the desired performance of the images.

More generally, this type of static image presentation in digital media can be inefficient or ineffective at achieving a desired goal for the digital media. For example, the image of the felled tree may be inefficient at retaining some visitors of the web page, or at causing some visitors of the web page to engage with the web page in another way such as clicking on a specific location on the web page, proceeding to a payment page, providing user information (e.g., an email address, a name, a credit card number, a telephone number, an age, a gender, etc.) to the server, viewing an advertisement or clicking on that advertisement, or the like.

In particular, because the same image is provided to all users at all times, the image may be ineffective for some of the users at some of the times. For example, for some users (e.g., users that have recently submitted a search query to a search engine including "leaning tree", "threatening tree", "a tree is threatening my home" or "how can I tell if a tree is about to fall"), an image of a tree leaning over and threatening a home may be more effective at keeping the user on the web page and/or at causing the user to become a customer than the image of the felled tree would be at achieving that goal. For example, other users that have recently submitted a search query to a search engine including "a tree is blocking my view", or "tree cutting services", may be more likely to engage with the image of the felled tree. The effectiveness of the two potential images can be difficult or impossible to know without the benefit of machine-learning with input data from many (e.g., tens, hundreds, thousands, or millions of users and/or network interactions).

In accordance with aspects of the disclosure, a system is provided in which an image server is coupled to a client server that generates the digital media. The image server includes a machine-learning engine that identifies a recommended image from an image database, using information from the client server about the goal for the image and/or information about the user obtained from the client server (e.g., if the user is already a customer with an account) or the user device. The recommended image that is selected by the machine-learning engine is provided from the image server for inclusion in the digital media.

In general, when an instance of the digital media is accessed at the user device of a user, the machine-learning engine of the image server is activated to identify and provide the identified image most likely to cause the desired engagement from that user at that time.

The disclosed system addresses a problem in rendering images in digital media, which is a problem specifically arising in the realm of computer technology, by providing a solution also rooted in computer technology, namely, by providing a network-connected machine-learning model, trained to identify images from an image database that drive various engagement metrics for the images and/or the digital media in which the images are rendered.

The subject system provides several advantages including retaining website visitors by rendering web pages with images selected by the machine-learning model to increase time-on-site. The subject system may provide a machine-learning capability where the system can learn from user engagement with images and digital media in order to learn which images drive which engagement with which digital media. In this regard, a machine-learning engine is provided that yields images with features that retain website visitors. With this approach, the system can continually improve its accuracy (and keep up with trending differences of what images are relevant to which users at various locations and at various times) by incorporating user interaction data into its model.

Although many examples provided herein describe a user's device or interaction information as being identifiable (e.g., a user's search history identifying the user's interactions with digital media including image-server-recommended images) and/or stored, each user may grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely on a server). In many examples, the user information does not include and/or share the specific identification of the user (e.g., the user's name) unless otherwise specifically provided or directed by the user.

Example System Architecture

FIG. 1 illustrates an example architecture 100 for context-based image selection for digital media suitable for practicing some implementations of the disclosure. The architecture 100 includes image servers 130, client servers 140, and user devices 110 connected over a network 150. As shown, third-party servers 160 may also be communicatively coupled to image servers 130, client servers 140, and/or user devices 110 via network 150. Third-party servers 160 may include content servers such as media websites, social media websites, or email servers, and/or advertisement servers, search engine servers, etc.

One or more of image servers 130 is configured to host a machine-learning engine such as a machine-learning engine implementing a computer-operated neural network. The neural network may be trained to identify images corresponding to one or more engagement goals for the image. One or more of image servers 130 also hosts a collection of images in an image database. The collection of images is accessible by an image distribution server to distribute images (e.g., to client servers 140, third-party servers 160, and/or user devices 110) selected by the machine-learning engine (e.g., responsive to a request to image servers 130 for an image for a particular engagement goal). Images from the collection, and feedback information from images that have been recommended or selected, can also be used to train the machine-learning engine to identify images likely to achieve various engagement goals (metrics) for particular users of the image and/or digital media in which the image is presented. For purposes of load balancing, multiple image servers 130 can host the neural network and multiple servers 130 can host the collection of images.

Image servers 130 can each be implemented with any device having an appropriate processor, memory, and communications capability for hosting the machine-learning engine, the collection of images, and the distribution server. User devices 110 can be, for example, desktop computers, mobile computers, tablet computers (e.g., including e-book readers), mobile devices (e.g., a smartphone or PDA), or any other devices having appropriate processor, memory, and communications capabilities for accessing digital media provided by client servers 140 and/or third-party servers 160 and including images from image servers 130. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Example Context-Based Image Selection

Figure 2:
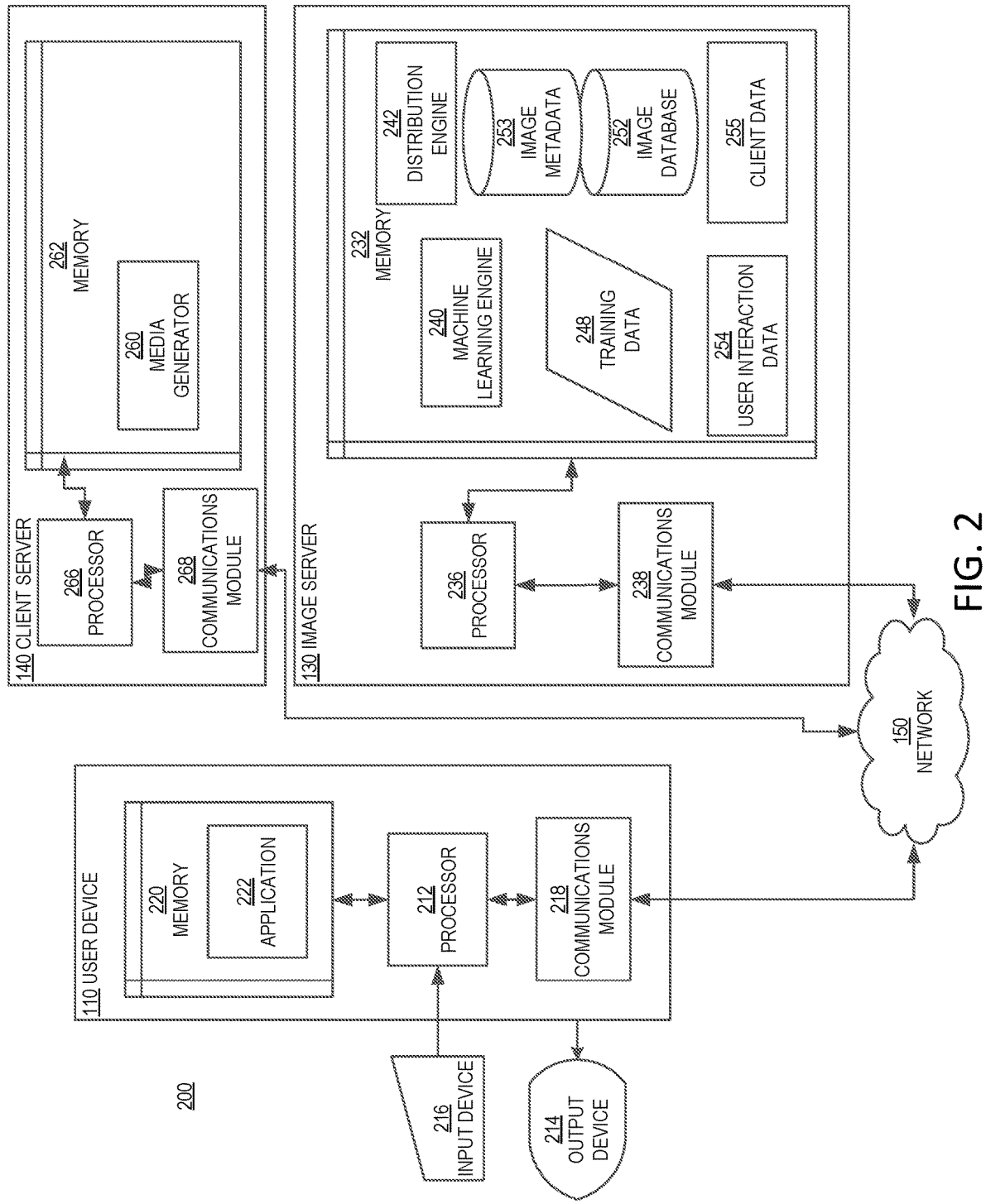
FIG. 2 is a block diagram illustrating an example user device, client server, and image server from the architecture of FIG. 1, according to certain aspects of the disclosure.

FIG. 2 is a block diagram 200 illustrating an example image server 130, client server 140, and user device 110 in the architecture 100 of FIG. 1, according to certain aspects of the disclosure. The user device 110, the client server 140, and the image server 130 are connected over the network 150 via respective communications modules 218, 268, and 238. The communications modules 218, 268, and 238 are configured to interface with the network 150 to send and receive information, such as data, requests, responses, and commands to other devices on the network. The communications modules 218, 268, and 238 can be, for example, modems or Ethernet cards.

The image server 130 includes a memory 232, a processor 236, and a communications module 238. The memory 232 of the image server 130 includes a machine-learning engine 240 and a distribution engine 242. In one or more implementations, machine-learning engine 240 may include a machine-learning model that implements a neural network. For example, the machine-learning model may utilize a deep neural network architecture or other deep-learning architecture. The machine-learning engine 240 may be provided with client data 255 such as an engagement goal for an image, user interaction data 254, and/or with access to image metadata 253 and image database 252. The machine-learning engine 240 may be trained to identify, based on the provided information, a recommended image from image database 252 that is likely to achieve a particular engagement goal if the image is included in a particular instance of a digital medium (e.g., a web page load, an email, a digital flyer, or a user interface), at a particular time, for a particular user. Once an image from image database 252 is identified by machine-learning engine 240, the image may be provided to user device 110, client server 140, and/or one or more third-party servers by distribution engine 242.

In order to train machine-learning engine 240, training data such as images from image database 252, engagement goals for those images, and actual engagement or interaction data associated with previous presentations of those images in digital media may be provided to, for example, a neural network architecture or other machine-learning architecture for training the neural network to produce a machine-learning model for machine-learning engine 240 (e.g., by tuning parameters such as weights between neurons of the network, biases, thresholds, and/or other aspects of the model). In this way, the machine-learning engine may be trained so that future engagement goals (and/or other information such as user information, client information, and/or third-party information) that are provided to the machine-learning model generate recommended images for that engagement goal (e.g., for a particular user or type of user at the time the image is requested).

Client data 255 may also include information associated with customers of the client (e.g., account information, location information, purchase history information, demographic information, location information, income information, or the like), information associated with content for digital media that is to include images recommended by machine-learning engine 240, and/or other information associated with the client (e.g., location information, sales history information, product information, sales goals information, location information, or the like) that may be provided to machine-learning engine 240 for selection of a recommended image for a particular instance of a digital medium (e.g., a web page, an email, a digital flyer, or a user interface), at a particular time, for a particular user.

The memory 232 also includes a collection of images in an image database 252. In one or more implementations, the image database 252 represents a database that contains, for each image, a mapping from an image identifier to a data file containing pixel data for the image (e.g., in jpeg format). The images may be paired with image metadata 253 such as image vector information and image cluster information. In one or more implementations, the image vector information identifies vectors representing a large sample of images (e.g., about 50 million) and the image cluster information identifies the vectors in one or more clusters such that each of the cluster of images represents a semantic concept. In one or more implementations, the image database 252 includes a pixel dataset for each image, where the pixel dataset indicates an array of pixel values for each color channel (e.g., red, blue, green) of the image. The array of pixel values may include an integer value in a range of 0 to 255 for each pixel, where the value indicates the desired luminance of a corresponding pixel location.

Also included in the memory 232 of the image server 130 is a set of training data 248. The training data 248 can be, for example, a dataset of images with known likelihoods to achieve particular engagement goals (e.g., at all times or in various operational scenarios, geographies, content environments, etc.). Although the set of training data 248 is illustrated as being separate from the image database 252, in certain aspects, the set of training data 248 includes a subset of the collection of images in image database 252. Furthermore, although the image database 252 and the distribution engine 242 are illustrated as being in the same memory 232 of an image server 130 as the machine-learning engine 240, in certain aspects, the image database 252 and the distribution engine 242 can be hosted in a memory of a different server but accessible by the image server 130 illustrated in FIG. 2.

The memory 232 also includes user interaction data 254. In certain aspects, the processor 236 is configured to receive the user interaction data 254 from user device 110 and client server 140 (and/or one or more third-party servers 160), identifying interactions of a user of user device 110 with recommended images from image database 252 and/or digital media in which the recommended images are presented at the user device. In this respect, the recommended images for various digital media from client server 140 and/or one or more third-party servers 160 may be personalized based on user interaction data 254 such as current interaction by the user with one or more digital media. For example, the processor 236 may determine (e.g., based on user interaction data 254) that a user interacted with a recommended image provided in digital media from client server 140, such as, by clicking on the image or a desired location within the image. The processor 236 may keep track of the user interactions by one or more users with a number of recommended images in various digital media over a given time period. The user interaction data 254 may also include data indicating search behavior (and/or patterns) relating to other activities of one or more users not associated with interacting with the image such as time viewing a particular web page (time-on-site), a history of previously viewed web pages, a search history, a purchase history, or other user information obtained from user device 110, client server 140, and/or one or more third-party servers.

The processor 236 of the image server 130 is configured to execute instructions, such as instructions physically coded into the processor 236, instructions received from software in memory 232, or a combination of both. For example, the processor 236 of the image server 130 executes instructions to receive, from a user device, an image request for an image that is associated with an engagement goal of a client that is unassociated with the user device, to identify, with a machine-learning engine and based on the engagement goal of the client, a recommended image from a plurality of images stored in an image database, and to provide the recommended image to the user device.

In certain aspects, the processor 266 of the client server 140 is configured to receive a request from user device 110 based on a user input to a user device 110. For example, input device 216 of user device 110 may be used to provide a web address of client server 140, to access an email from client server 140, or to open an application 222 stored in memory 220 that, when executed by processor 212, interfaces with client server 140. Responsive to the user input, user device 110 obtains digital media from client server 140 (e.g., by sending a request such as a hypertext transfer protocol (HTTP) request or an application programming interface (API) request to the client server and receiving a response). Obtaining the digital media may also include (e.g., responsive to the response received from the client server 140) sending, via communications module 218, an image request to image server 130 to obtain an image for inclusion in the digital media when the digital media generated by media generator 260 stored in memory 262 of client server 140 and provided to user device 110 is presented at the user device (e.g., using output device 214, such as a display). The image request may be sent from client server 140 rather than from user device 110 in some implementations. When an image request is received, machine-learning engine 240 of image server 130 identifies a recommended image based on an engagement goal for the image and/or other information such as client data 255 and/or user interaction data 254. Distribution engine 242 then provides the recommended image to user device 110 and/or client server 140.

A client may provide one or more engagement goals and/or additional information such as client data 255 to image server 130. The engagement goal may be input by a client into client server 140 in a given natural language (e.g., English). However, the client goal or metric may be provided in a natural language other than the English language depending on implementation such that the image server 130 is configured to process search queries in any arbitrary natural language. A client, operating client server 140, may submit engagement goals using direct input or by selecting from one or more engagement goal options provided by image server 130 (e.g., in a selectable list). In some aspects, the engagement goals may be provided by a manually-entered input, by a voice recognition command, by a visual recognition command, or other machine-learned input command. The image server 130 may provide input interface where the engagement goals may be typed in or selected, for example. The input section may include one or more controls to allow the user to obtain an image link that is associated with the engagement goal(s).

Rather than including an image in the digital media with media generator 260, client server 140 includes the image link provided by image server 130 in the digital media. When the image link in the digital media is accessed (e.g., at the user device), a request for an image corresponding to the client's engagement goals is provided to image server 130 and the image is obtained and returned for inclusion in the presentation of the digital media at that time.

Figure 3A:
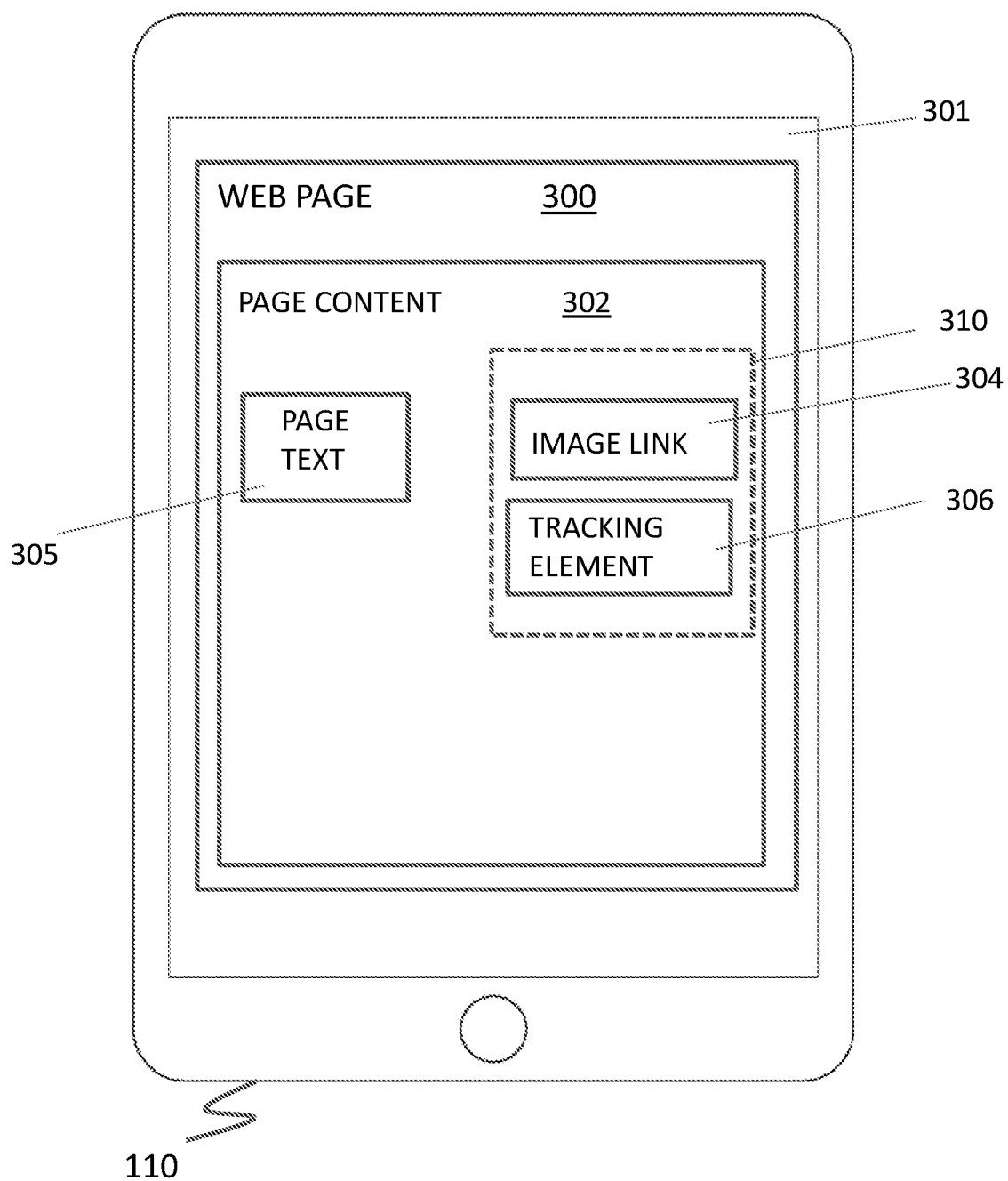
FIG. 3A illustrates an example web page including code for a context-based image, according to certain aspects of the disclosure.

FIG. 3A illustrates an example of digital media that may be provided in accordance with aspects of the subject disclosure. In the example of FIG. 3A, the digital media is implemented as a web page for display on user device 110.

As shown in FIG. 3A, a display such as display 301 of user device 110 may be operated to display a web page 300. Web page 300 may be, for example, a web page of a client associated with client servers 140. The client may be a business, a newspaper, a magazine, or other news organization, a social media organization, or the like. The web page may be served from a website hosted by client servers 140.

In the example of FIG. 3A, web page 300 includes page content 302, which may include page text 305. Page text 305 may be human-language (e.g., English) text such as a news article or text describing the client or one or more products of the client. When web page 300 is loaded (e.g., by a browser application running on user device 110), page text 305 may be provided, for example, from client server 140. The client may also desire that page content 302 include one or more images to drive some type of desired customer engagement. The desired customer engagement may define one or more engagement goals for the image. Engagement goals may include increasing the time a customer is on web page 300, causing a customer to click on a specific location on web page 300, causing a customer to convert to a paying customer (e.g., by clicking a purchase option), causing a customer to provide customer information (e.g., an email address, a name, a credit card number, etc.), or causing a customer to view an advertisement or to click on that advertisement (as examples). It should also be appreciated that these example engagement metrics are illustrative and other engagement metrics are contemplated. As another illustrative example, if a camera at the user device is active while an image is displayed, the portion of the image or digital media at which the user looks and/or the expression on the user's face may be detected and/or tracked using the camera. One or more engagement metrics associated with where the user is looking and/or the user's expression may be provided such as an engagement goal of causing the user to look at the image and/or a link associated with the image or causing the user to smile or laugh.

However, as indicated in FIG. 3A, the page content 302 that is provided from client server 140 does not include the desired image. Instead, page content 302 includes an image link 304. When device 110 receives image link 304 with the initial page content from client server 140, device 110 then follows the image link to retrieve the desired image from image server 130. Image link 304 may, for example, be an HTTP address or other computer-readable link to client information at image server 130. As discussed in further detail hereinafter, image link 304 is generated at image server 130 and provided to client server 140 for inclusion in digital media such as web page 300.

Image server 130 may store code that uses machine-learning engine 240 to identify a recommended image from the images in image database 252 for image link 304. Accordingly, image link 304 may include engagement goal information or may link to engagement goal information stored at image server 130. Machine-learning engine 240 may use the engagement goal associated with image link 304 to identify the recommended image to be included in page content 302 being loaded/rendered at user device 110.

Additional information may be provided to image server 130 when image link 304 is accessed. For example, image server 130 may receive browser history information, user interaction data, user location information, and/or other user-specific information from user device 110. Image server 130 may also receive some of the additional information from client server 140, such as client information such as product information, information associated with page content 302 (e.g., some or all of the content of the page may be provided to image server 130), and/or other information associated with the client. In some scenarios (e.g., if the user of user device 110 has an account with the client), some user information may be provided to image server 130 from client server 140. For example, a user's purchase history, income information, demographic or location information, or browsing history may be provided from client server 140 to image server 130 when image link 304 is accessed at the user device. In some scenarios, additional information may be received at image server 130 from one or more third-party servers 160.

Some or all of the additional information received (e.g., from user device 110 and/or client server 140, and/or one or more third-party servers 160) when link 304 is accessed may also be provided to machine-learning engine 240 for identification of the recommended image that will drive the engagement goal for the particular user of user device 110 at the time that particular web page 300 is loaded at the user device. Distribution engine 242 of image server 130 provides the recommended image to user device 110 for inclusion in page content 302.

Machine-learning engine 240 may be trained to identify the recommended images for various engagement goals for various combinations of users, clients, media contents, locations, and/or the like based on images previously placed into digital content (e.g., by recommendation of the machine-learning engine or random or other selection) and tracking information associated with those placed images. The tracking information may include information obtained by providing a tracking element such as a digital cookie or other tracking code or data together with a test image, and monitoring, using the tracking element, one or more users' interactions with the digital media that includes the provided test image (e.g., tracking the time one or more users view the digital media when various different images are included, the frequency of clicks received when various different images are included, positions and/or motions of the user's cursor when different images are included, revenue generated when various images are used, or other tracking metrics such as metrics associated with the engagement goals described herein). This training may occur before web page 300 is loaded at user device 110 and/or may continue after web page 300 is loaded.

For example, in order to continually improve the efficacy of the recommended images at achieving the engagement goals, image server 130 may provide a tracking element such as tracking element 306 for inclusion in the digital media along with image link 304. Tracking element 306 includes a code snippet for execution at the client server to store and/or provide information associated with activity of user device 110 (e.g., particularly with respect to the engagement goal associated with image link 304) to image server 130. The code snippet may be provided from image server 130 to client server 140 and used by client server 140 to provide engagement information associated with activity at the user device back to image server 130 for further training of the machine-learning model. Tracking element 306 may also include tracking data such as a digital cookie that can be stored at the user device and used by the code snippet for tracking engagement activity at the user device.

As indicated in FIG. 3A, image link 304 (and the image that is provided when image link 304 is accessed) may be provided as a part of another element 310 of web page 300, such as an advertisement or a clickable link. For example, the image that is provided when image link 304 is accessed may be wholly or partially clickable when provided in web page 300. In this example, the image may have been recommended by image server 130 (e.g., using machine-learning engine 240) for an engagement goal of causing the user to click on the image or portion of the image. In another example, element 310 is an advertisement that includes the image that is provided when image link 304 is accessed. In this example, the image may have been recommended by image server 130 (e.g., using machine-learning engine 240) for an engagement goal of causing the user to purchase an advertised product or remain on web page 300 for an increased amount of time for extended viewing of the advertisement.

Figure 3B:
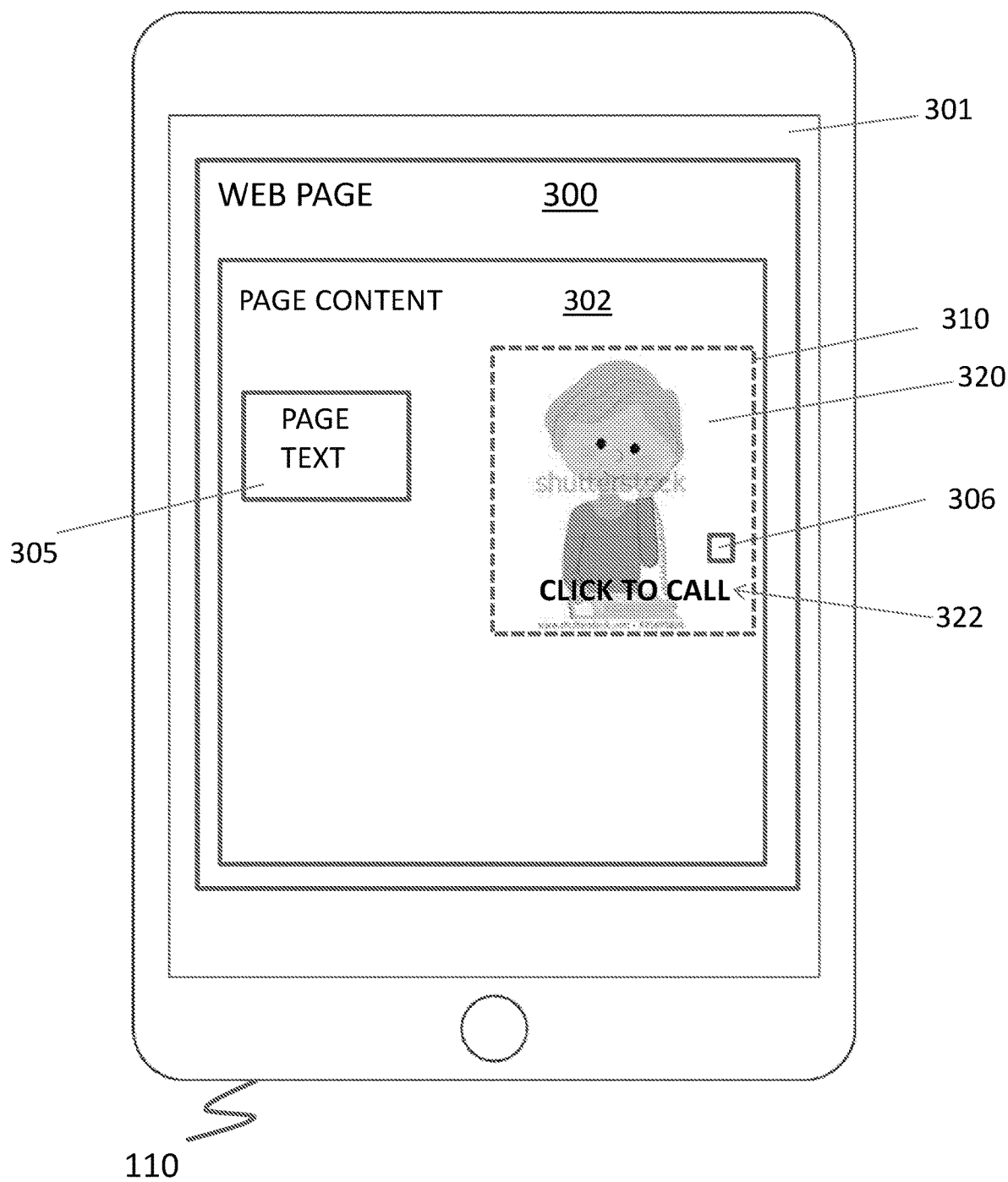
FIGS. 3B and 3C illustrate the example web page of FIG. 3A following insertion, using the code, of two different example context-based images, according to certain aspects of the disclosure.
Figure 3C:
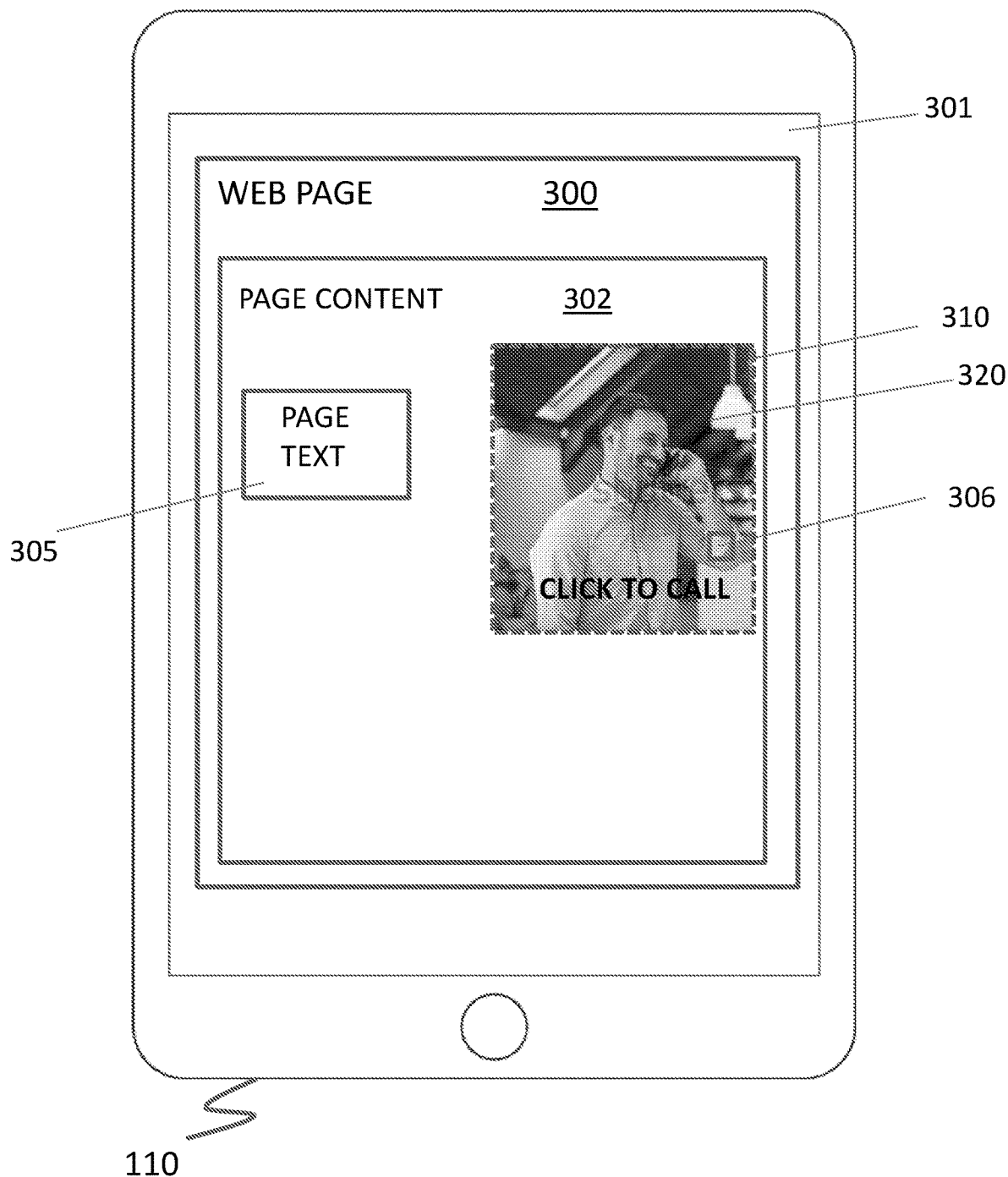

In one example scenario that is illustrated in FIGS. 3B and 3C, web page 300 may be an "About Us" page of a business that is a client of image server 130. The business would like to include an image associated with a "click to call" button in the "About Us" page. In this example scenario, element 310 is the "click to call" button and the client has a desired engagement goal of increasing the number of clicks to that "click to call" button (e.g., in order that as many customers as possible engage for sales of a product or service of the business). However, the business is unlikely to be expert in what type of image to include in element 310 to achieve the engagement goal.

Using, for example, client server 140, the business may access a client account at image server 130 and request an "image performance" unit. Image server 130 may then generate the image performance unit for the client, including image link 304 (e.g., a universal resource locator such as http://img.imageserver.com/userid/123456789.jpg) and tracking element 306 (e.g., a code snippet such as a cascading style sheet (CSS) tag for inclusion in the "click to call" button 310). In this example, tracking element 306 is used to track whether or how often, for a given traffic load, customer traffic to the business web page 300 generates the desired engagement (e.g., clicking on the "click to call" button).

Image server 130 may test different images in the "click to call" button based on the customer location and other attributes of the traffic to web page 300. Over time and using machine-learning engine 240, image server 130 improves image recommendations to drive the desired engagement based on the attributes of the visiting traffic to the website. In this way, millions of images in image database 252 are available for selection and insertion in page content 302 based on which are most performant for a particular user, at a particular time.

For example, in one operational scenario that is illustrated in FIG. 3B, image server 300 may receive user information (e.g., browser history information, account information, or other information) from user device 110 and/or client server 140, the user information indicating that the user of the "About Us" web page 300 is female and over seventy years of age. In this operational scenario, a trained machine-learning engine 240, receiving the user information and the click-to-call goal of the client, may identify an image 320 for inclusion in web page 300 that shows a grey-haired female calling from a corded phone. As shown, image 320 may be provided with text 322 for element 300 such as "Click to Call" overlaid on image 320. As shown, tracking element 306 may also be included in element 310 with the image 320 and the overlaid text 322. Although tracking element 306 is visible in FIG. 3B, it will be appreciated that the tracking element may, in practice, include a piece of code and/or other data that is embedded in element 310 and not visible to the user of web page 300.

FIG. 3C illustrates another operational scenario in which a 28 year old male accesses the same "About Us" web page 300 hosted by client server 140. In this operational scenario, user device 110 of the 28 year old male (and/or client server 140) may provide user information to image server 130 indicating that the user is male and under thirty years of age. As shown in FIG. 3C, in this operational scenario, a trained machine-learning engine 240, receiving the user information and the click-to-call goal of the client, may identify an image 320 for inclusion in web page 300 that shows a young male at home, smiling, and calling from a mobile phone. This different image is then included in the rendered web page at user device 110 with the overlaid text and the tracking element.

Figure 4:
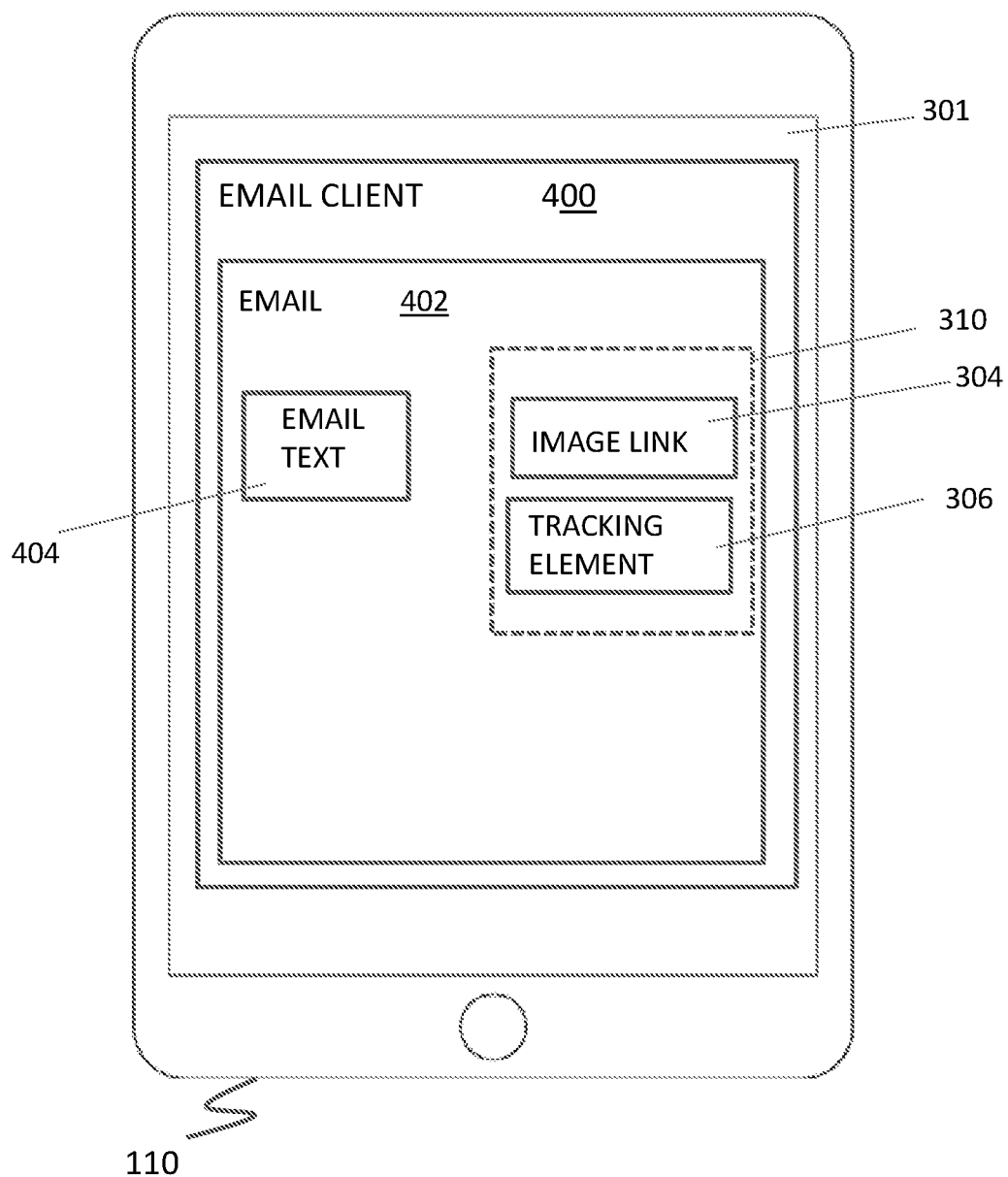
FIG. 4 illustrates an example email including code for a context-based image, according to certain aspects of the disclosure.

Although the examples of FIGS. 3A-3C show digital media including image link 304 implemented as a web page, it should be appreciated that image server 130 may provide image links 304 and associated images for other digital media such as electronic flyers, application user interfaces, and/or email or text message communications. For example, FIG. 4 shows an implementation in which image link 304 and tracking element 306 (e.g., as a part of element 310) are included in an email 402 being viewed with an email client 400 running on user device 110. In this example, email 402 includes email text 404 and/or other email content from, for example, client server 140. In this example, email client 400 may access image link 304 to obtain an image associated with an engagement goal from image server 130 when the user opens email 402 or when a list entry for email 402 is provided by email client 400. In this example, image link 304 may be associated with an engagement goal of causing a customer to open email 402 (e.g., if the image is presented in the list entry), causing the customer to view the email for an increased amount of time, or causing the user to click the image or follow another link associated with the image and included in the email.

Figure 5:
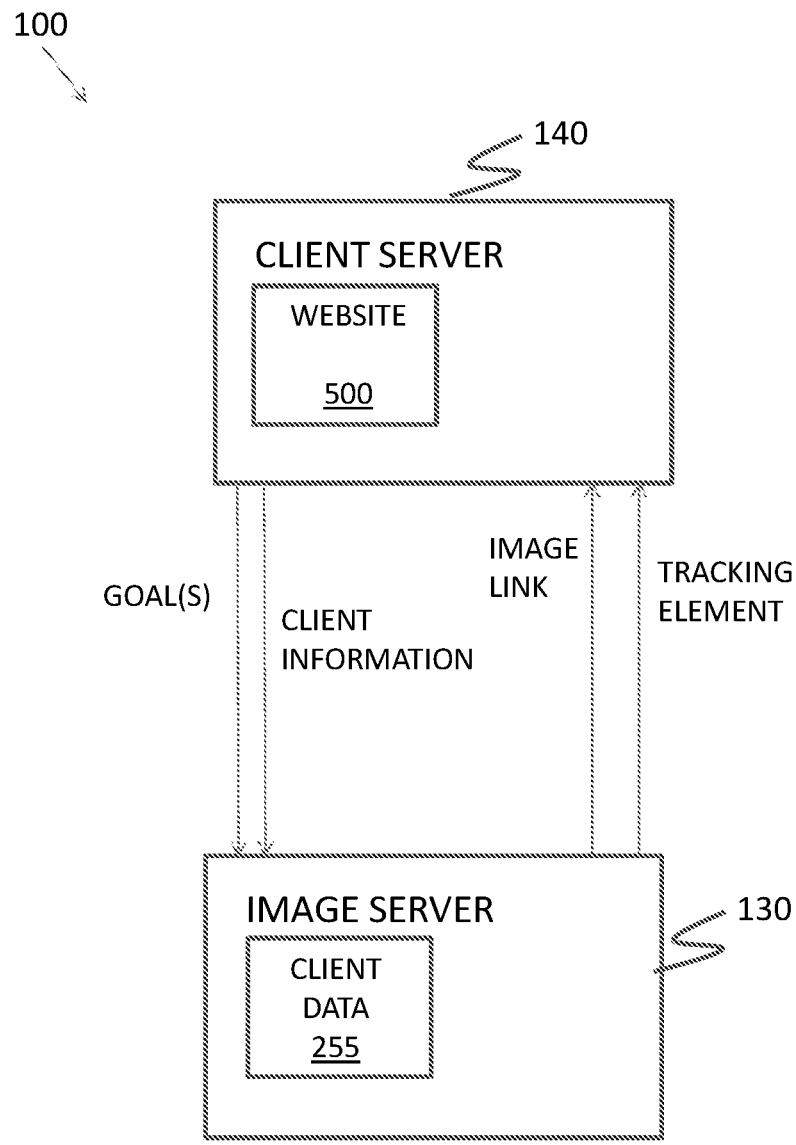
FIG. 5 illustrates a block diagram showing various data exchanges during a setup operation for context-based image selection, according to certain aspects of the disclosure.

FIG. 5 illustrates a block diagram showing example communications between image server 130 and client server 140, according to certain aspects of the disclosure. For example, the operations illustrated may be performed to generate image link 304 and/or tracking element 306 of FIGS. 3A and 4. As shown in FIG. 5, client server 140 such as a client server hosting a website 500 from which web page 300 of FIGS. 3A-3C can be loaded, provides one or more engagement goals and client information to image server 130. Image server 130 may receive the one or more engagement goals and client information and may store the received one or more engagement goals and client information as client data 255. The client information may include information associated with the digital media in which the image is to be included (e.g., whether the digital media is a web page, an email, or other media, and/or the location and/or functionality of an element 310 associated with the image), content information for the digital media, client product information, and/or user account information (as examples).

The one or more engagement goals and client information may be provided in a request from the client server for an image performance unit from image server 130. Responsive to the request, image server 130 generates an image link and a tracking element and provides the image link and tracking element to client server 140. Image server 130 also generates code (e.g., a code snippet) that configures the image server to later provide the one or more engagement goals and/or some or all of the client information to machine-learning engine 240 when a user engages with the provided image link, for identification of a recommended image for the image link.

Figure 6A:
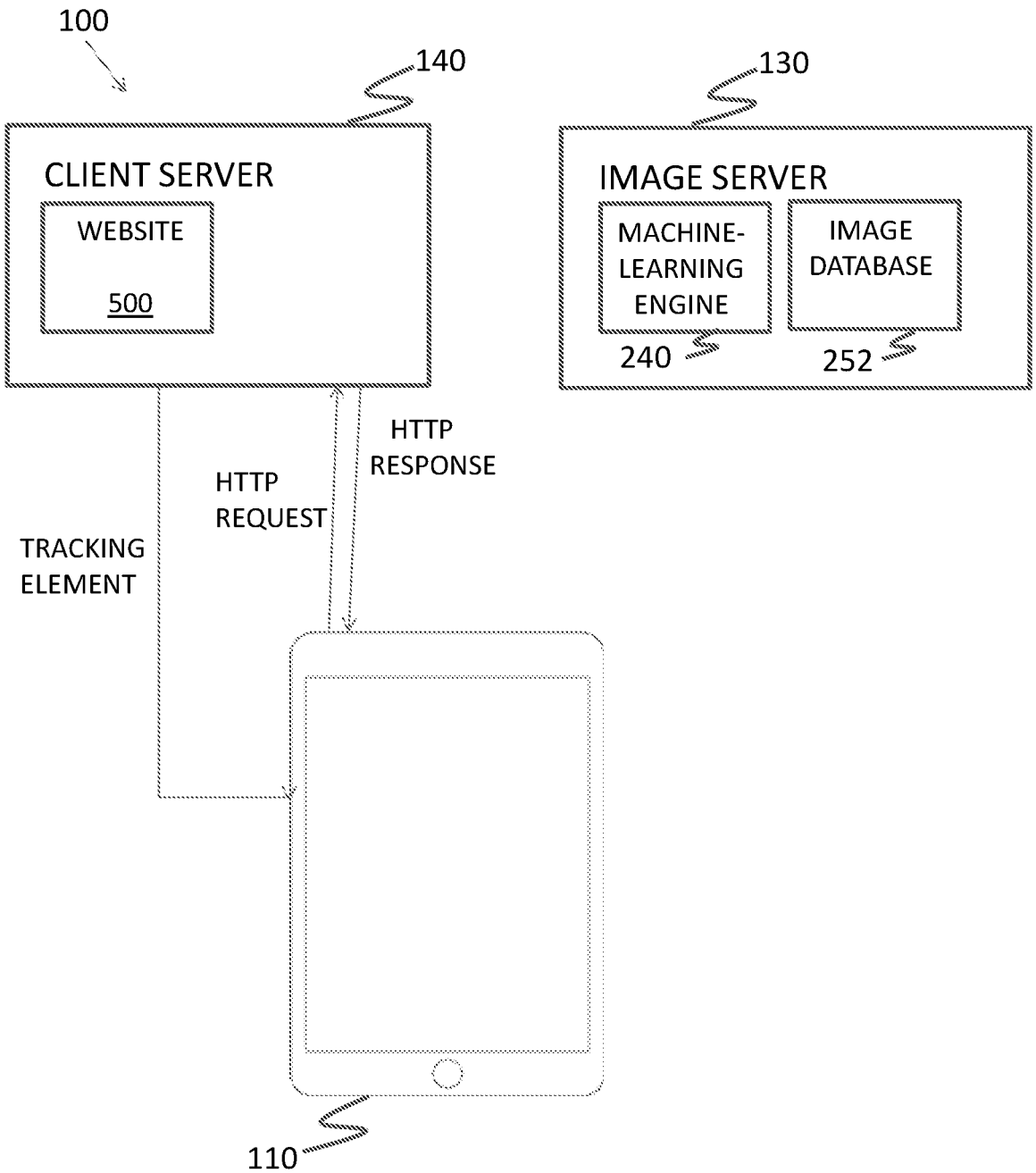
FIGS. 6A and 6B illustrate block diagrams of various data exchanges during an example process for context-based image selection for digital media using the components of FIG. 2.
Figure 6B:
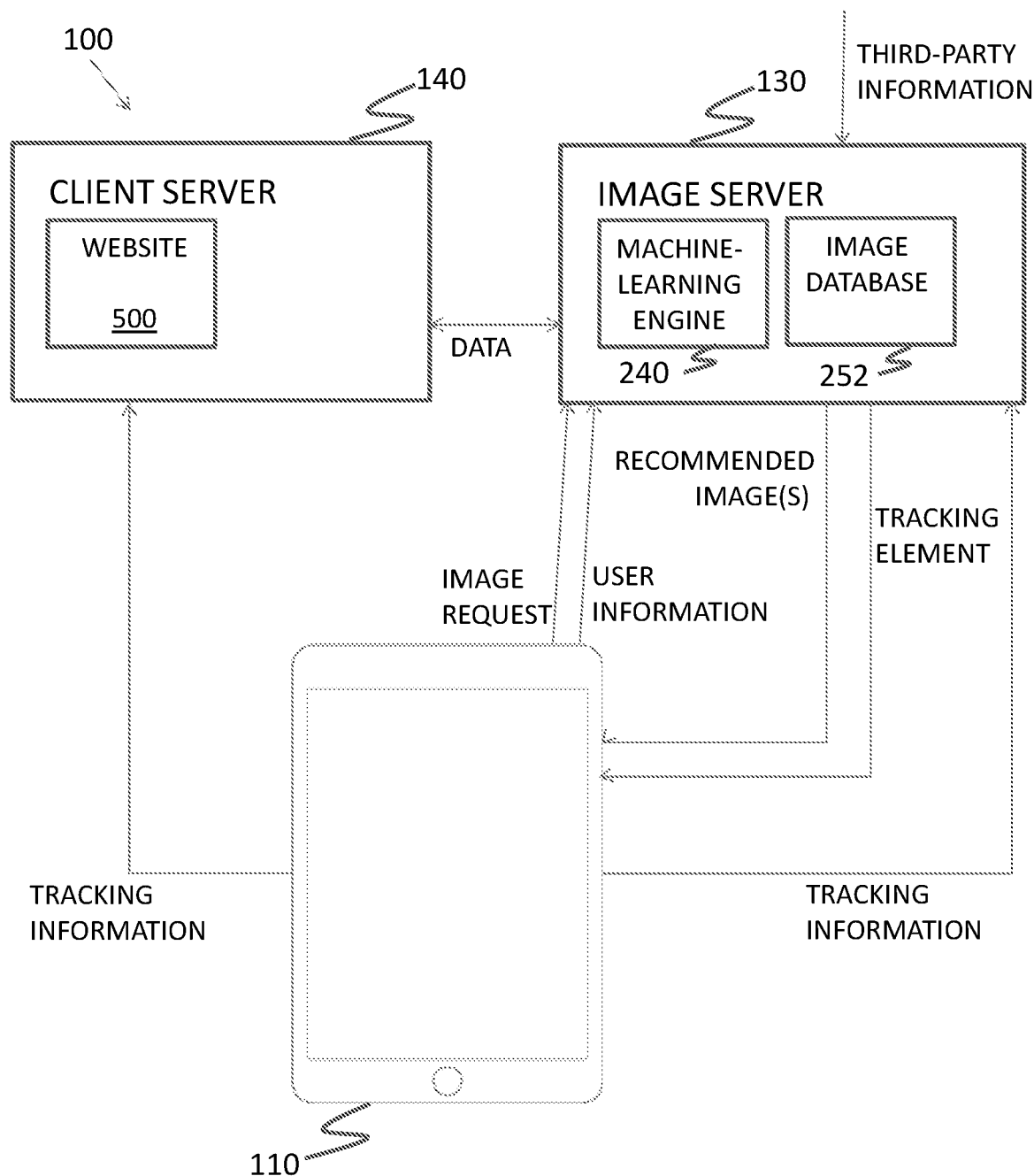

Once the image link and tracking element have been provided to client server 140, client server 140 includes the image link and the tracking element in the digital media to be provided to one or more user devices. FIGS. 6A and 6B illustrate block diagrams of system architecture 100 during an example operation for loading web page 300 of FIGS. 3A-3C, after the image link and tracking element have been provided to client server 140 from image server 130.

As shown in the example of FIG. 6A, user device 110 may send a request for digital media (e.g., an HTTP request for web page 300) to client server 140 hosting website 500 from which web page 300 can be loaded. Responsive to the request, client server 140 provides a response (e.g., an HTTP response) to user device 110. In some implementations, client server 140 may provide its own tracking element and/or a tracking element previously received from image server 130 to user device 110. The response provided to user device 110 from client server 140 includes image link 304, which was previously provided from image server 130 to client server 140 as described above in connection with FIG. 4.

As shown in the example of FIG. 6B, using the image link received from client server 140 with the response, user device 110 provides an image request to image server 130. The image request may include information with which image server 130 obtains one or more engagement goals and/or other information such as third-party information (e.g., information from a third party server about the user and/or the client) and/or client information associated with that link. As indicated, user device 110 may also provide user information to image server 130 with the image request. The user information may include browsing history information, location information, and/or other information associated with the user of user device 110.

The engagement goal(s) associated with the image request, along with some or all of the client information, user information, and/or third-party information are provided to machine-learning engine 240 for identification, using a trained machine-learning model, of one or more recommended images from image database 252. As indicated in FIG. 6B, the recommended image(s) are then provided to user device 110 for inclusion in digital media such as web page 300 being displayed at device 110. FIG. 6B also shows how tracking information associated with the provided image(s) (e.g., information indicating the length of time the user device displays the digital media including the image, click information, etc.) may be provided from user device 110 to image server 130 and/or client server 140.

Although the example of FIGS. 6A and 6B show an operational scenario in which an image request is provided to image server 130 from user device 110 responsive to an interaction with client server 140, it should be appreciated that, in other scenarios, the image request may be made to image server 130 without any interaction with client server 140. For example, digital media stored at the user device (e.g., a digital flyer or coupon), stored at another server (e.g., an email stored at a mail server), or loaded from a third-party server (e.g., a news website) can include an image link that causes the user device to request an image from image server 130 for inclusion in that digital media.

As one particular example, the image may be an image for an advertisement that is to be provided to user device 110 from a third-party content server such as a news website or social media website or from a third-party advertisement server (ad server). For example, when a user operating user device 110 loads a web page from a social media server, the social media server may include a digital advertisement in that social media web page. The digital advertisement may include text and one or more images. The image(s) for the advertisement may be provided from image server 130, according to one or more engagement goals for that advertisement.

That is, the social media server may provide the social media web page with an advertisement link that causes user device 110 to obtain a digital advertisement from an ad server for inclusion in that web page. When the user device requests the digital advertisement from the ad server, the ad server provides advertisement text and an image link that was previously provided from image server 130 to the ad server, to the user device. The user device then requests the image using the provided image link for inclusion in the digital advertisement in the social media web page being rendered at the user device.

Figure 7:
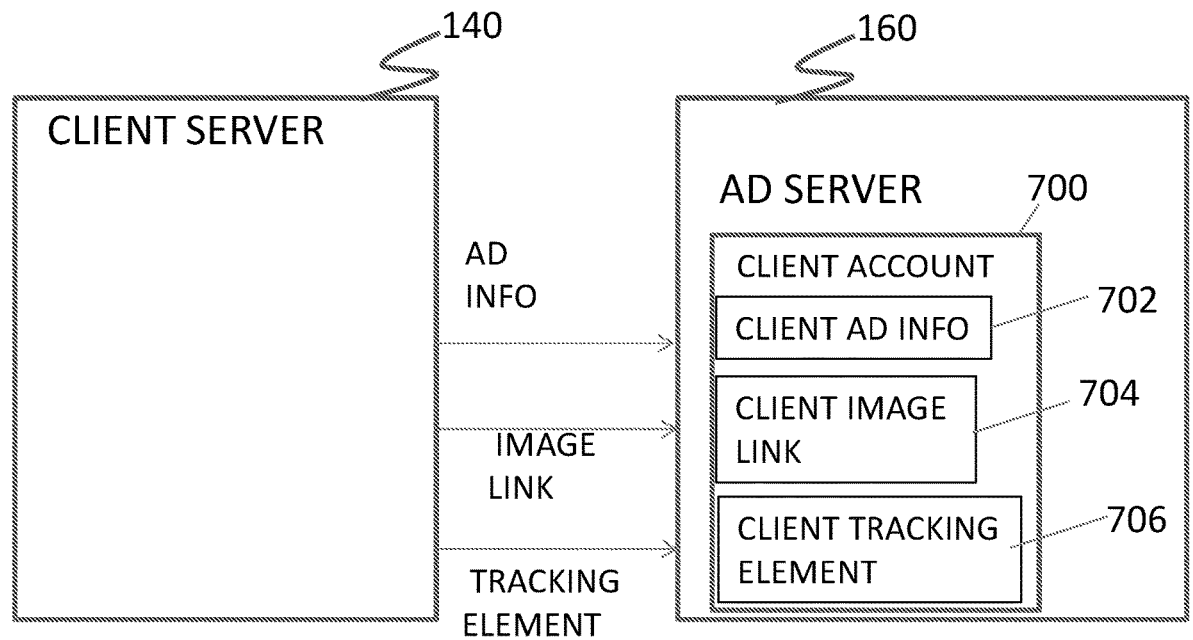
FIG. 7 illustrates a block diagram showing various data exchanges during a setup operation for context-based image selection for an advertisement, according to certain aspects of the disclosure.
Figure 8:
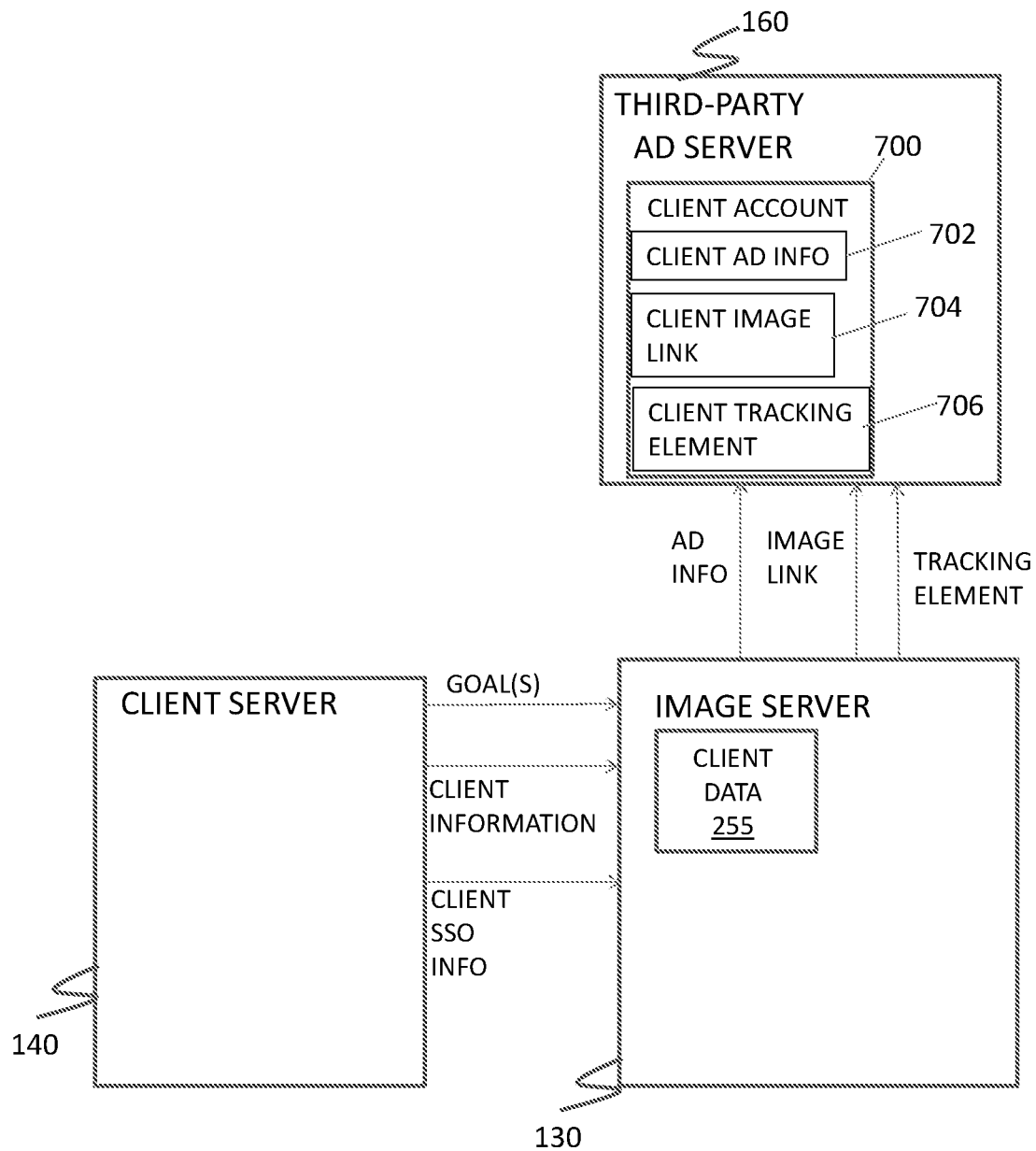
FIG. 8 illustrates a block diagram showing various data exchanges during another setup operation for context-based image selection for an advertisement, according to certain aspects of the disclosure.

FIGS. 7 and 8 illustrate block diagrams showing example operations for providing an image link from image server 130 to an ad server, for inclusion of recommended images from image server 130 in advertisements from the ad server.

In the example of FIG. 7, client server 140 provides an image link that was previously obtained from image server 130 (e.g., as described above in connection with FIG. 5) to a third-party server 160, implemented as an advertisement server. The tracking element provided to client server 140 from image server 130 with the image link may also be provided to ad server 160.

In this example, client server 140 also provides advertisement information (ad info) to ad server 160. Ad information provided from client server 140 to ad server 160 may include advertisement text and/or any other information that may be used by ad server 160 to generate a digital advertisement for the client that includes the image link previously obtained from image server 130. As indicated, ad server 160 may store a client account 700 in which the ad information provided from client server 140 is stored as client ad information 702, the image link provided from client server 140 is stored as a client image link 704, and the tracking element received from client server 140 is stored as a client tracking element 706.

In the example of FIG. 8, instead of providing the image link from image server 130 to client server 140, and from client server 140 to ad server 160, image server 130 interacts with ad server 160 on behalf of client server 140 to generate an ad including an image link for one or more engagement goals of the client. In this example, client server 140 provides one or more engagement goals and client information to image server 130 as described above in connection with FIG. 5. In the example of FIG. 8, the client information may also include advertisement information for generating a digital advertisement with ad server 160 (e.g., as described above in connection with FIG. 7). In the example of FIG. 8, client server 140 also provides, to image server 130, client credential information such as single-sign-on (SSO) information with which image server 130 can log into advertisement server 160 on the client's behalf. The engagement goal(s) and/or client information can be stored as client data 255. Client SSO information can be securely stored by the image server in some circumstances, or can be securely provided by the client for each log-on event to advertisement server 160 without being stored at the image server.

In the example of FIG. 8, image server 130 generates an image link corresponding to the one or more engagement goals and/or client information as described above in connection with FIG. 5. In this example, the client may be a business that desires to create a retargeting ad unit using ad server 160. The client may desire that the retargeting ad unit include an image and a text overlay, but that the image be selected using machine-learning engine 240 of image server 130. In this example, image server 130 logs into client account 700 of the client using the client SSO information, and uses an API to provide ad information to ad server 160 to create different ads at ad server 160 using different images identified with machine-learning engine 240 corresponding to the client engagement goals. As indicated in the figure, image server 130 may also provide a tracking element for inclusion in the advertisement to obtain feedback (tracking) information to continue to train machine-learning engine 240 to converge on one or more images that are most performant for the client's engagement goals.

Figure 9:
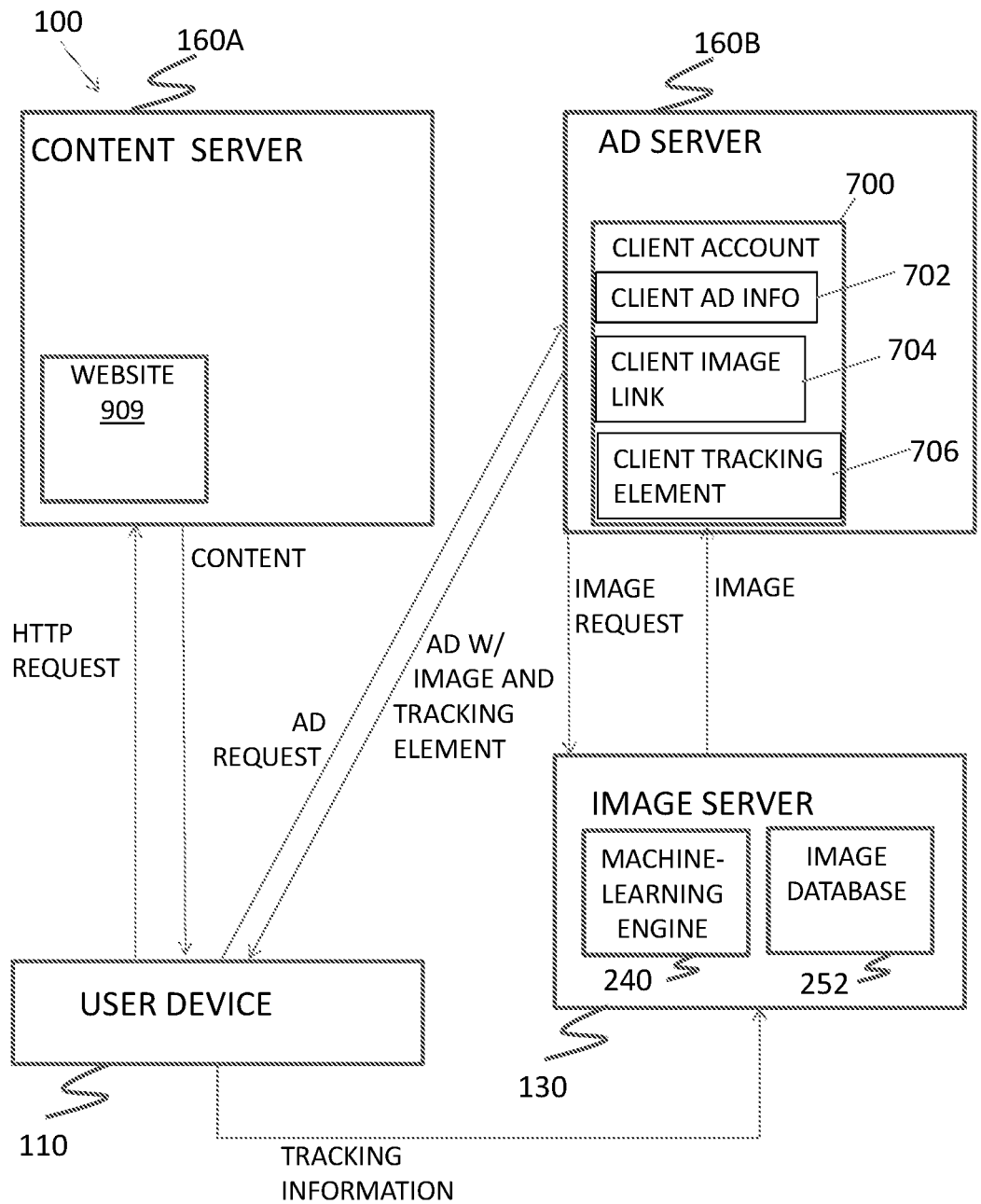
FIG. 9 illustrates a block diagram of various data exchanges during an example process for context-based image selection for digital media including advertisements using the components of FIG. 2.
Figure 10:
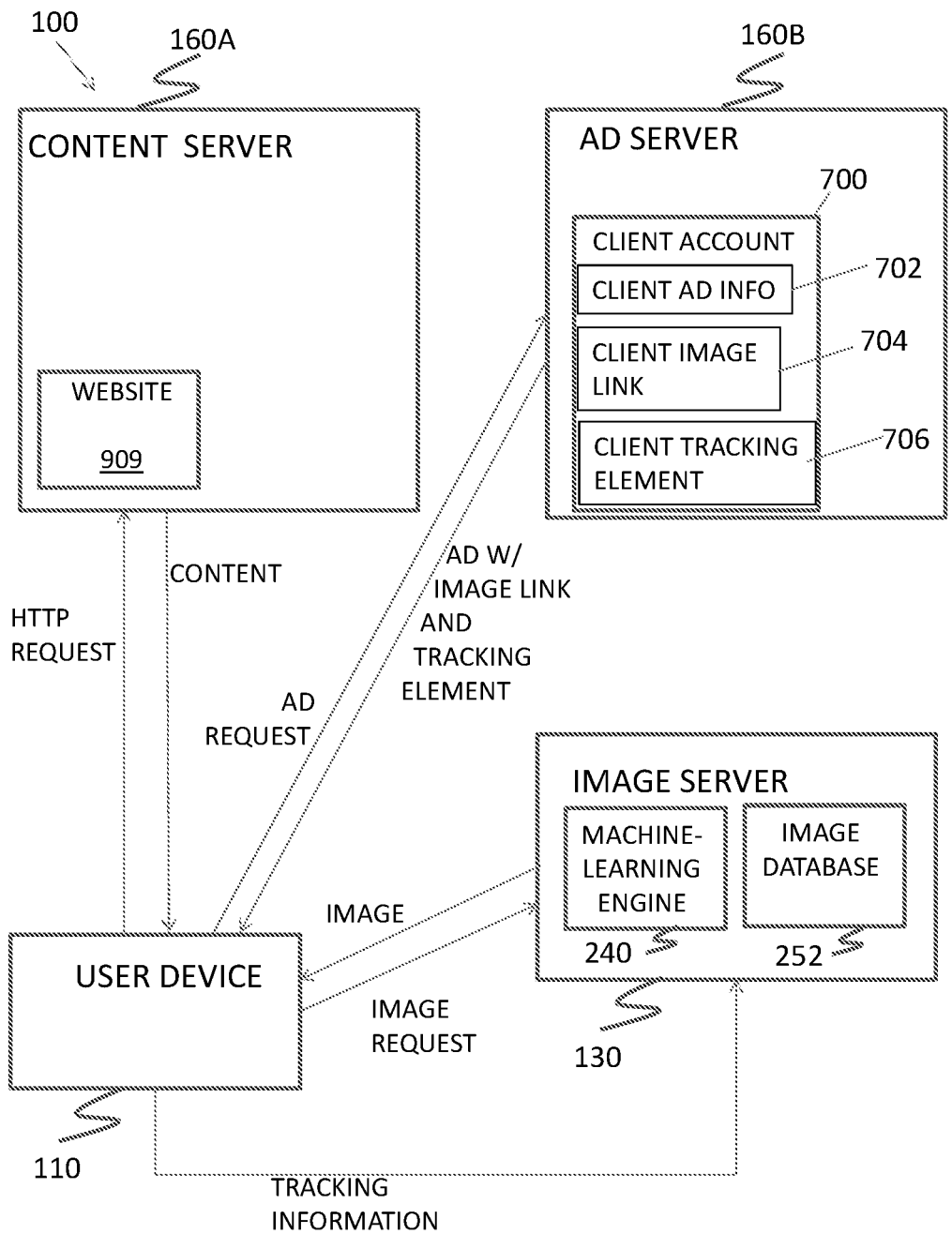
FIG. 10 illustrates a block diagram of various data exchanges during another example process for context-based image selection for digital media including advertisements using the components of FIG. 2.

FIGS. 9 and 10 illustrate block diagrams showing example operations for including a recommended image from image server 130 in a digital advertisement from an ad server. In the example of FIG. 9, the ad server obtains the image from image server 130 and includes the image in an advertisement generated by the ad server. In the example of FIG. 10, the ad server includes the image link in an advertisement generated by the ad server and the user device obtains the image for the advertisement from image server 130.

More specifically, in the example of FIG. 9, user device 110 sends a request such as an HTTP request to another third-party server such as content server 160A. Content server 160A may be a server that hosts a website 909 such as a news website, a social media website, or any other website that may include advertisements in web pages. Responsive to the request, content server 160A provides a response including content and a link to obtain one or more advertisements from ad server 160B, which stores client image link 704 and client tracking element 706 previously provided by image server 130.

User device 110 then provides an ad request to ad server 160B for one or more advertisements to be included with the content received from content server 160A. Responsive to the ad request from user device 110, ad server 160B provides an image request to image server 130 using the image link previously provided by image server 130. The image request may include information with which image server 130 obtains one or more engagement goals and/or other information such as third-party information (e.g., information from a third party server about the user and/or the client) and/or client information associated with that link. User device 110 and/or ad server 160B may also provide user information, client information, and/or advertisement information to image server 130 with the image request.

The engagement goal(s) associated with the image request, along with some or all of the client information, user information, and/or third-party information (e.g., advertisement information or user information from ad server 160B) are provided to machine-learning engine 240 for identification, using a trained machine-learning model, of one or more recommended images from image database 252. As indicated in FIG. 9, the recommended image(s) are then provided to ad server 160B. Ad server 160B may then provide one or more advertisements including one or more images received from image server 130 (and/or one or more tracking elements from image server 130 and/or from ad server 160B) to user device 110 for inclusion in digital media, such as web page 300 being displayed at user device 110. FIG. 9 also shows how tracking information associated with the provided image(s) and/or advertisement(s) may be provided from user device 110 to image server 130. It should also be appreciated that tracking information may also, or alternatively, be provided to ad server 160B and/or client server 140.

In the example of FIG. 9, ad server 160B obtains an image from image server 130 before including the obtained image in an advertisement that is provided to user device 110 for inclusion in digital media with content from content server 160A. However, as shown in FIG. 10, in other operational scenarios, responsive to the ad request from user device 110, ad server 160B may provide one or more advertisements with image links (and tracking elements if desired) previously received from image server 130. In this example, responsive to the receiving the advertisement(s) with the image link(s), user device 110 provides an image request to image server 130. The image request may include information with which image server 130 obtains one or more engagement goals and/or other information such as third-party information (e.g., information from a third party server about the user, the advertisement(s) and/or the client) and/or client information associated with that link. User device 110 may also provide user information to image server 130 with the image request. The user information may include browsing history information, location information, and/or other information associated with the user of user device 110.

The engagement goal(s) associated with the image request, along with some or all of the client information, user information, and/or third-party information (e.g., advertisement information or user information from ad server 160B) are provided to machine-learning engine 240 for identification, using a trained machine-learning model, of one or more recommended images from image database 252. As indicated in FIG. 10, the recommended image(s) are then provided to user device 110 for inclusion in the advertisement(s) provided from ad server 160B in digital media, such as web page 300 being displayed at device 110. FIG. 10 also shows how tracking information associated with the provided image(s) and/or advertisement(s) may be provided from user device 110 to image server 130. It should also be appreciated that tracking information may also, or alternatively, be provided to ad server 160B and/or client server 140.

Although the example of FIGS. 9 and 10 show operational scenarios in which an ad request leading to an image request is provided to ad server 160B from user device 110 responsive to an interaction with content server 160A, it should be appreciated that, in other scenarios, the ad request may be made to ad server 160B without any interaction with content server 160A. For example, digital media stored at the user device (e.g., a digital flyer or coupon), stored at another server (e.g., an email stored at a mail server), or loaded from client server 140 can include an ad link that causes user device 110 to request an ad that is to include an image from image server 130.

Figure 11:
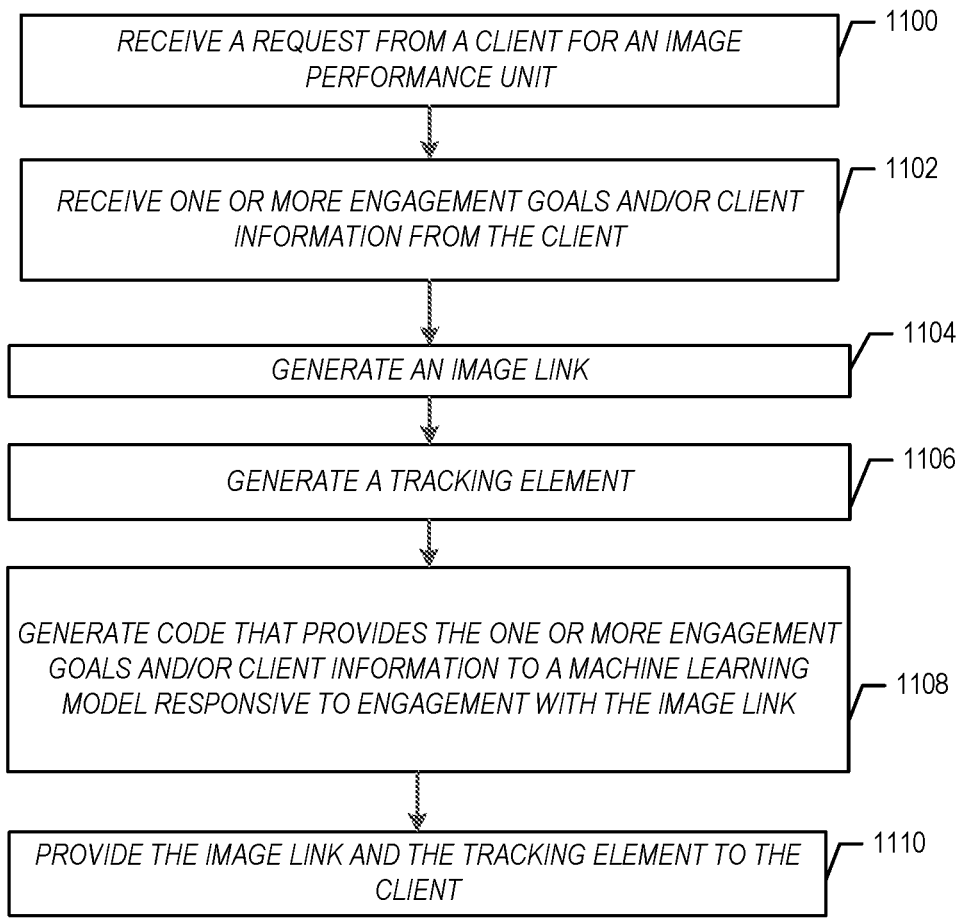
FIG. 11 illustrates an example process for a setup operation for context-based image selection, according to certain aspects of the disclosure.

FIG. 11 illustrates a flow diagram of an example process for setup operations for context-based selection and insertion of images for digital media, in accordance with one or more implementations. For explanatory purposes, the process of FIG. 11 is primarily described herein with reference to one or more devices of FIGS. 1 and 2 (particularly with reference to image server 130), which may be executed by one or more processors of the image server 130 of FIGS. 1 and 2. However, the process of FIG. 11 is not limited to the server 130, and one or more blocks (or operations) of the process may be performed by one or more other components of other suitable devices. Further for explanatory purposes, the blocks of the process of FIG. 11 are described herein as occurring in serial, or linearly. However, multiple blocks of the process of FIG. 11 may occur in parallel. In addition, the blocks of the process of FIG. 11 need not be performed in the order shown and/or one or more blocks of the process of FIG. 11 need not be performed and/or can be replaced by other operations.

At block 1100, a request for an image performance unit is received at an image server such as image server 130 from a client server such as client server 140. As described herein, the image server stores a plurality (e.g., millions) of images in an image database such as image database 252. In one example, the image performance unit may be an image performance unit for an article about a topic to be provided in a client web page such as web page 300 of FIGS. 3A-3C, or to be provided by a content server such as a news website or a social media website.

At block 1102, the image server receives one or more engagement goals for the image performance unit from the client server. The one or more engagement goals may include one or more goals such as increasing a time a user device displays a web page associated with the client server, causing a customer to click on a specific location on the web page associated with the client server, causing the customer to click a purchase option on the web page associated with the client server, causing a customer to provide customer information to the client server, causing a user to open an email or an article, causing the customer to view an advertisement, and/or causing the customer to click on the advertisement (as examples). In one example, the one or more engagement goals may include a performance metric such as time-on-site (e.g., the client may want to increase this metric, as more time on-site corresponds to more time reading the article, and/or more time absorbing advertisements within or around the article).

At block 1104, the image server generates an image link such as image link 304 of FIG. 3A or 5, for the image performance unit.

At block 1106, the image server may also generate a tracking element for the image performance unit. The tracking element may include a web cookie, a CSS tag, and/or other tracking code such as a code snippet to be stored and/or executed at the client server for tracking of engagement activity at a user device accessing a website hosted at the client server.

At block 1108, the image server generates code (e.g., another code snippet for execution at the image server) to provide the one or more engagement goals to a machine-learning engine such as machine-learning engine 240 having access to information (e.g., image metadata 253 and/or the image pixel values) associated with the plurality of images, responsive to an engagement (e.g., by user device 110) with the image link. Engagement with the image link can occur at a user device when the user device renders a web page, opens an email, renders a digital flyer or coupon, or renders a user interface display for a software application (as examples). In some scenarios, client information may also be received from the client server (e.g., as described above in connection with FIG. 5). In these scenarios, generating the code to provide the one or more engagement goals to the machine-learning engine having access to information associated with the plurality of images, responsive to the engagement with the image link, may include generating the code to provide the one or more engagement goals and the client information to the machine-learning engine having access to information associated with the plurality of images.

At block 1110, the image server provides the image performance unit including the image link to the client server. Providing the image performance unit including the image link to the client server may include providing the image performance unit including the image link and the tracking element to the client server.

As described above in connection with, for example, FIGS. 5, 6A, and 6B, the image server may also receive an indication of an engagement, at a user device such as user device 110, with the image link. The image server may provide, responsive to the indication, the one or more engagement goals to the machine-learning engine, identify, with the machine-learning engine and based on the one or more engagement goals, a recommended image from the plurality of images, and provide the recommended image to the user device. The image server may also receive engagement (tracking) information from the user device using the tracking element.

For the one example noted above in which the client generates an article about a topic, and provides a time-on-site engagement goal for the images for the article, information about the article such as text around the image location in the article may be provided to machine-learning engine 240. Using article content such as text around the image location, machine-learning engine 240 can identify several different recommended images to increase tune-on-site specifically for that content. Using the engagement (tracking) information received using the tracking element, the machine-learning engine can test the different recommended images in comparison to the engagement information for those images, until the machine-learning engine learns to identify one or more of the images that maximize the time-on-site for the article.

Because the machine-learning engine can be provided with additional information such as user information (e.g., location information, etc.), machine-learning engine 240 may determine that one image should be provided for one group of users (e.g., website visitors from Europe), and another image should be provided for another group of users (e.g., website visitors from the United. States). Machine-learning engine 240 may thus select images, in some examples, based on geography, and may segment traffic accordingly. In one illustrative scenario, machine-learning engine 240 identifies a number of images (e.g., a thousand images) for one or more zip codes and optimizes recommendations of images to these zip-code micro-segments. Image recommendations may be more or less finely identified depending on account levels of the client account with the image server. Image server 130 may also provide data (e.g., via a client interface such as a client interface website or application) regarding the effectiveness of the recommended images at achieving the desired engagement. Machine-learning engine 240 may continuously learn to improve recommendations with more user interactions with recommended images and associated digital media.

Figure 12:
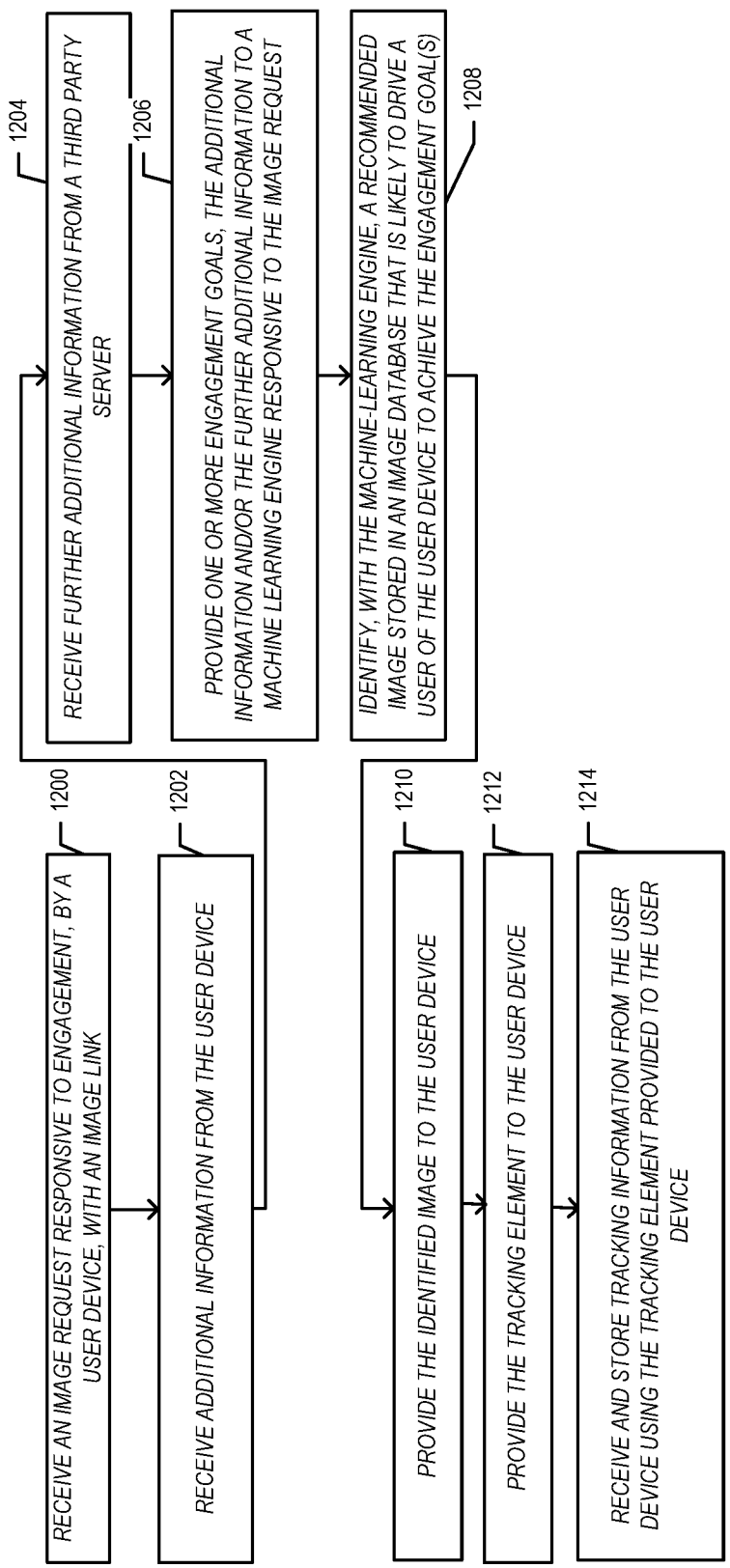
FIG. 12 illustrates an example process for context-based image selection for digital media, according to certain aspects of the disclosure.

FIG. 12 illustrates a flow diagram of an example process for context-based selection and insertion of images for digital media in accordance with one or more implementations. For explanatory purposes, the process of FIG. 12 is primarily described herein with reference to one or more devices of FIGS. 1 and 2 (particularly with reference to image server 130), which may be executed by one or more processors of the image server 130 of FIGS. 1 and 2. However, the process of FIG. 12 is not limited to the server 130, and one or more blocks (or operations) of the process may be performed by one or more other components of other suitable devices. Further for explanatory purposes, the blocks of the process of FIG. 12 are described herein as occurring in serial, or linearly. However, multiple blocks of the process of FIG. 12 may occur in parallel. In addition, the blocks of the process of FIG. 12 need not be performed in the order shown and/or one or more blocks of the process of FIG. 12 need not be performed and/or can be replaced by other operations.

At block 1200, image server 130 receives an image request responsive to engagement, by a user device (e.g., user device 110), with an image link (see, e.g., image link 304 of FIG. 3A). The image link may have been previously provided to a client server such as client server 140 of a client of the image server or an advertisement server or other third-party server (e.g., and subsequently provided by the client server to the user device). The image link may be an image link for obtaining the image for inclusion in digital media of the client. The digital media of the client may be a web page, an email, a digital flyer, or a user interface of an application (as examples). The image request may be for an image that is associated with an engagement goal of a client that is unassociated with the user device.

At block 1202, the image server may receive additional information from the user device. The additional information may include location information, browser history information, and/or other information about the user.

At block 1204, the image server may receive further additional information from a third party server such as third-party server 160 of FIG. 1. For example, the further additional information may include information associated with a user of the user device from a third party.

At block 1206, the image server may provide one or more engagement goals, the additional information and/or the further additional information (e.g., client information, user information, and/or third party information) to a machine-learning engine (e.g., with a trained machine-learning model) responsive to the image request. The one or more engagement goals may have been previously received from the client prior to receiving the image request from the user device. The one or more engagement goals may include one or more goals such as increasing a time a user device displays a web page associated with the client server, causing a customer to click on a specific location on the web page associated with the client server, causing the customer to click a purchase option on the web page associated with the client server, causing a customer to provide customer information to the client server, causing a user to open an email or an article, causing the customer to view an advertisement, and causing the customer to click on the advertisement (as examples). In one example, the one or more engagement goals may include a performance metric such as time-on-site (e.g., the client may want to increase this metric, as more time-on-site corresponds to more time reading the article, and/or more time absorbing advertisements within or around the article).

At block 1208, the image server may identify, with the machine-learning engine, a recommended image from a plurality of images stored in an image database such as image database 252 that is likely to drive a user of the user device to achieve the one or more engagement goals (e.g., based on the one or more engagement goals, user information, client information, content information, third-party information, and/or other information).

At block 1210, the image server may provide the identified image to the user device.

At block 1212, the image server may provide the tracking element generated at block 1106 to the user device. In other examples, the tracking element may be provided to the user device by the client server together with content for the digital media.

At block 1214, the image server may receive and store tracking information from the user device (e.g., information associated with the user device such as a location of the user device or a browsing history from a browser of the user device) using the tracking element provided to the user device. In some examples, identifying the recommended image at block 1208 includes identifying the recommended image with the machine-learning engine and based on the engagement goal of the client and the information associated with the user device.

Figure 13:
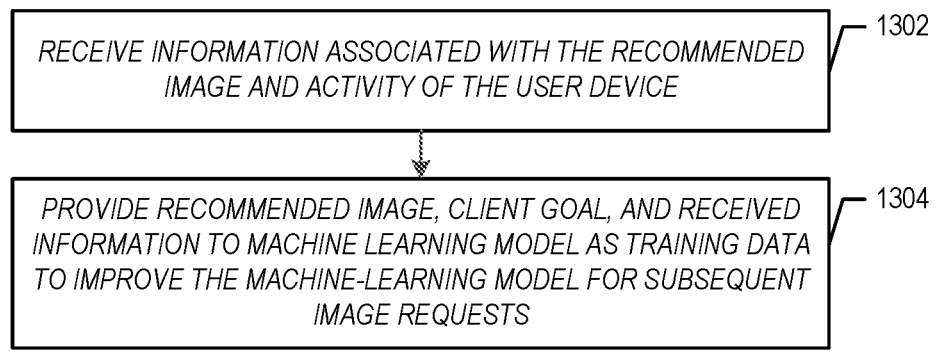
FIG. 13 illustrates an example process for training a machine-learning engine for context-based image selection for digital media, according to certain aspects of the disclosure.

FIG. 13 is a flowchart of illustrative operations that may be performed for improvement of machine-learning engine 240 (e.g., improvement by further training of the machine-learning model of the machine-learning engine) in accordance with aspects of the disclosure.

For example, at block 1302, the image server may receive the information associated with the user device that includes engagement information indicating engagement at the user device with the provided selected image. The engagement information may indicate the user's time-on-site, click activity, or the like, when the recommended image is displayed at the user device.

At block 1304, the image server may provide the recommended image, the engagement goal, and the information indicating the engagement at the user device with the provided recommended image, as training data to the machine-learning engine (e.g., to improve the machine-learning model for subsequent image requests).

As described above in connection with, for example, FIGS. 7 and 8, in some scenarios an image link for obtaining recommended images for digital media from image server 130 may be provided to an advertisement server (e.g., when the digital media includes one or more advertisements).

Figure 14:
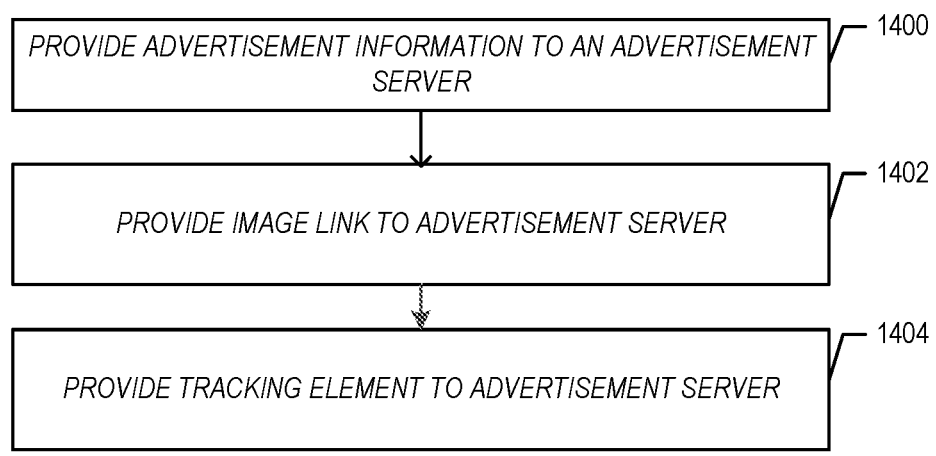
FIG. 14 illustrates an example process for a setup operation for context-based image selection for advertisements, according to certain aspects of the disclosure.

FIG. 14 illustrates a flow diagram of an example process for providing an image link for obtaining recommended images for digital media from image server 130 to an advertisement server, in accordance with one or more implementations. For explanatory purposes, the process of FIG. 14 is primarily described herein with reference to one or more devices of FIGS. 1, 2, 7, and 8 (particularly with reference to image server 130, client server 140, and/or ad server 160), which may be executed by one or more processors of the image server 130 of FIGS. 1 and 2. However, the process of FIG. 14 is not limited to the image server 130, and one or more blocks (or operations) of the process may be performed by one or more other components of other suitable devices. Further for explanatory purposes, the blocks of the process of FIG. 14 are described herein as occurring in serial, or linearly. However, multiple blocks of the process of FIG. 14 may occur in parallel. In addition, the blocks of the process of FIG. 14 need not be performed in the order shown and/or one or more blocks of the process of FIG. 14 need not be performed and/or can be replaced by other operations.

At block 1400, advertisement information is provided to an advertisement server such as advertisement server 160 of FIG. 7 or 8. In some scenarios, the advertisement information is provided to the advertisement server from client server 140 as described above in connection with FIG. 7. In some scenarios, the advertisement information is provided to the advertisement server from image server 130 as described above in connection with FIG. 8.

At block 1402, an image link is provided to the advertisement server. In some scenarios, the image link is provided to the advertisement server from client server 140 as described above in connection with FIG. 7. In some scenarios, the image link is provided to the advertisement server from image server 130 as described above in connection with FIG. 8.

At block 1404, a tracking element is provided to the advertisement server. In some scenarios, the tracking element is provided to the advertisement server from client server 140 as described above in connection with FIG. 7. In some scenarios, the tracking element is provided to the advertisement server from image server 130 as described above in connection with FIG. 8.

Figure 15:
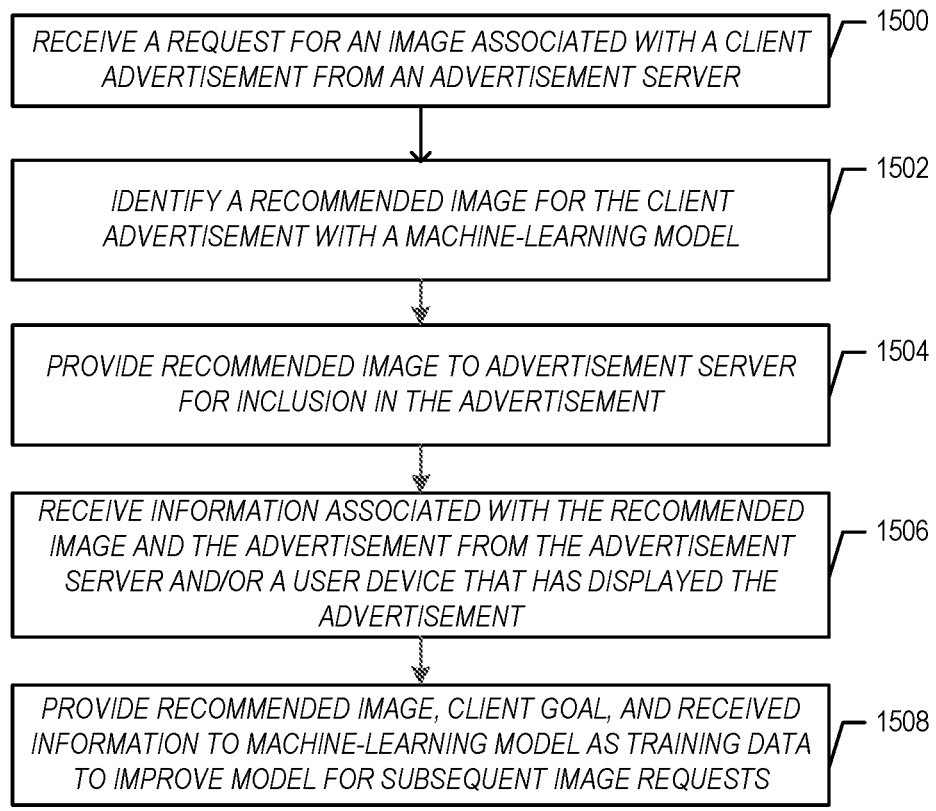
FIG. 15 illustrates an example process for context-based image selection for advertisements, according to certain aspects of the disclosure.

FIG. 15 illustrates a flow diagram of an example process for providing context-based images for advertisements once the image link and/or the tracking element have been provided to the advertisement server for inclusion in an advertisement for the client, in accordance with one or more implementations. For explanatory purposes, the process of FIG. 15 is primarily described herein with reference to one or more devices of FIGS. 1, 2, and 9 (particularly with reference to image server 130), which may be executed by one or more processors of the server 130 of FIGS. 1 and 2. However, the process of FIG. 15 is not limited to the server 130, and one or more blocks (or operations) of the process may be performed by one or more other components of other suitable devices. Further for explanatory purposes, the blocks of the process of FIG. 15 are described herein as occurring in serial, or linearly. However, multiple blocks of the process of FIG. 15 may occur in parallel. In addition, the blocks of the process of FIG. 15 need not be performed in the order shown and/or one or more blocks of the process of FIG. 15 need not be performed and/or can be replaced by other operations.

In the illustrated example, at block 1500, image server 130 receives a request for an image associated with a client advertisement from an advertisement server. The client advertisement may be undergoing rendering at a user device as part of digital media from another server such as a client server or a third-party content server. The advertisement server may provide the image request to the image server responsive to an advertisement request from a user device.

At block 1502, image server 130 identifies a recommended image for the client advertisement with a machine-learning model (e.g., based on one or more client goals such as engagement goals for the advertisement and/or the image, and/or other information associated with the user, the client, the digital media, and/or the advertisement).

At block 1504, image server 130 provides the recommended image to the advertisement server for inclusion in the advertisement when the advertisement is rendered at the user device. In this example, the advertisement may be provided with the image included, to the user device from the advertisement server.

At block 1506, image server 130 receives information associated with the recommended image and the advertisement from the advertisement server and/or a user device that has displayed the advertisement. The information may indicate whether the user performed the desired engagement with the image and/or the advertisement according to the client goal(s).

At block 1508, image server 130 provides the recommended image, client goal, and received information to the machine-learning model as training data to improve the model for subsequent image requests.

Figure 16:
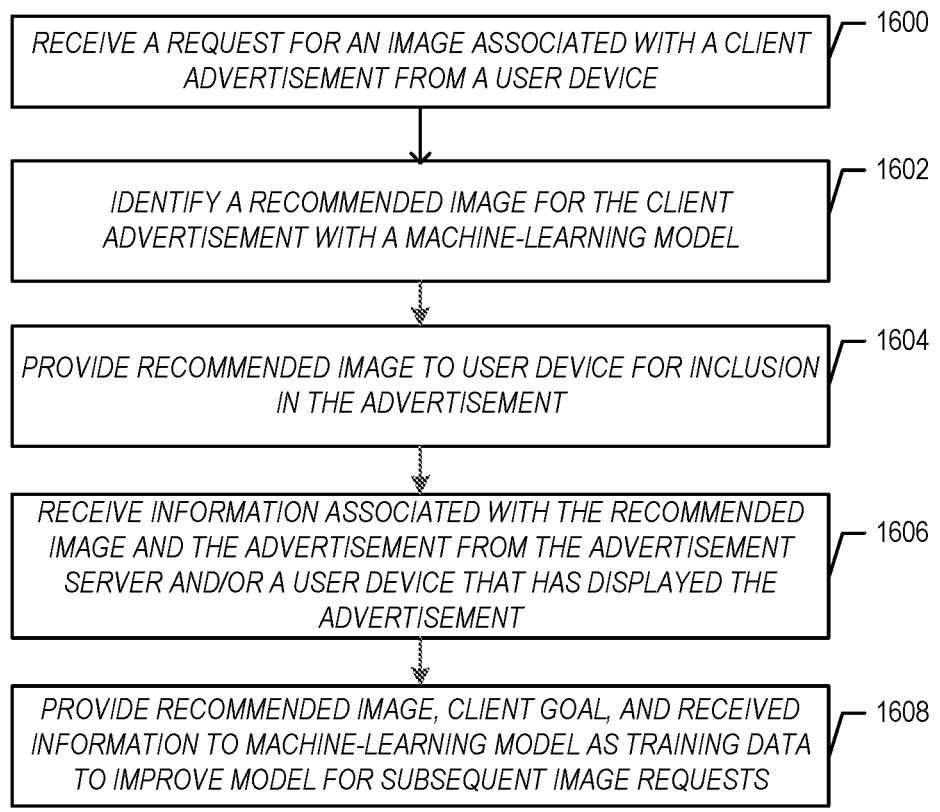
FIG. 16 illustrates another example process for context-based image selection for advertisements, according to certain aspects of the disclosure.

FIG. 16 illustrates a flow diagram of another example process for providing context-based images for advertisements once the image link and/or the tracking element have been provided to the advertisement server for inclusion in an advertisement for the client, in accordance with one or more implementations. For explanatory purposes, the process of FIG. 16 is primarily described herein with reference to one or more devices of FIGS. 1, 2, and 10 (particularly with reference to image server 130), which may be executed by one or more processors of the image server 130 of FIGS. 1 and 2. However, the process of FIG. 16 is not limited to the server 130, and one or more blocks (or operations) of the process may be performed by one or more other components of other suitable devices. Further for explanatory purposes, the blocks of the process of FIG. 16 are described herein as occurring in serial, or linearly. However, multiple blocks of the process of FIG. 16 may occur in parallel. In addition, the blocks of the process of FIG. 16 need not be performed in the order shown and/or one or more blocks of the process of FIG. 16 need not be performed and/or can be replaced by other operations.

In the illustrated example, at block 1600, image server 130 receives a request for an image associated with a client advertisement from a user device such as user device 110. The client advertisement may be undergoing rendering at a user device as part of digital media from another server, such as a client server or a third-party content server. The image request may be associated with an image link provided in the advertisement from an advertisement server to the user device that is rendering the advertisement.

At block 1602, image server 130 identifies a recommended image for the client advertisement with a machine-learning model (e.g., based on one or more client goals such as engagement goals for the advertisement and/or the image, and/or other information associated with the user, the client, the digital media, and/or the advertisement).

At block 1604, image server 130 provides the recommended image to the user device for inclusion in the advertisement that is being rendered from the advertisement server at the user device.

At block 1606, image server 130 receives information associated with the recommended image and the advertisement from an advertisement server and/or the user device that has displayed the advertisement. The information may indicate whether the user performed the desired engagement with the image and/or the advertisement according to the client goal(s).

At block 1608, image server 130 provides the recommended image, client goal, and received information to the machine-learning model as training data to improve the machine-learning model for subsequent image requests.

The present disclosure provides a system for real-time selection and insertion of images into digital media such as web pages, emails, user interfaces, or the like. The system includes an image server that selects a recommended image for the digital media based on context for that media. The context may include an engagement goal for the image, such as a goal to keep the user at a website, to cause the user to click the image, or other engagement goals as described herein. The context may also include information associated with the content of the digital media, information associated with a user of the digital media, information associated with a client providing the digital media, or other context information as described herein.

The system includes an image server that receives an image request for insertion of an image into a digital medium. The image server also receives an engagement goal for the image and/or information about the intended user or viewer of the digital media. For example, the image server may receive a request from a user device loading a web page from a client server for an image to be included in the web page. The request may include an engagement goal, such as a goal for the user to click on the image once the image is displayed in the web page. The image server may also receive information about the user from the user device, from the client server, or from a third party. The image server may provide the engagement goal and the information about the user to a machine-learning model that has been trained to identify an image that will drive that user, at that time, to that engagement goal (e.g., entice that user to click on the image while the image is displayed). The image server may also provide a tracking element such as a cookie or a cascading style sheet (CSS) tag to be included in the web page. The tracking element may return interaction information about the user's current interaction with the web page (e.g., time-on-site, click activity, etc.) and/or user history information (e.g., browsing history or social media activity or data) to the image server for selection of the image and/or for future selection of images for other digital media. In this way, systems and methods are provided for automated, real-time image selection and insertion for electronic media.

Hardware Overview

Figure 17:
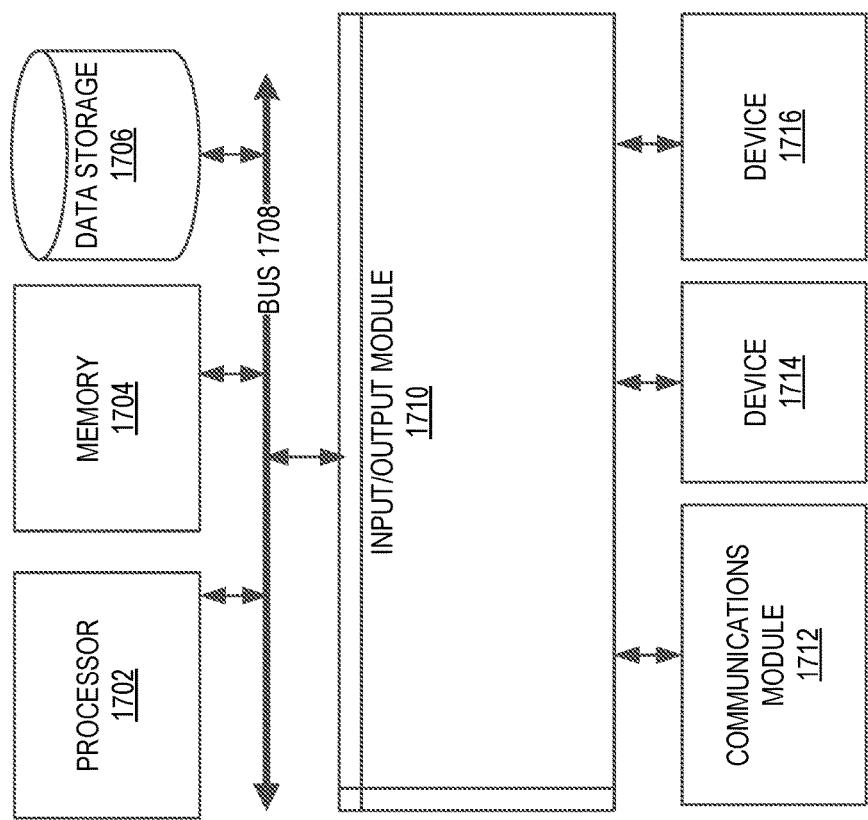
FIG. 17 is a block diagram illustrating an example computer system with which the user device, client server, and/or image server of FIG. 2 can be implemented.

FIG. 17 is a block diagram illustrating an exemplary computer system 1700 with which the user device 110, image server 130, client server 140, and/or third-party server(s) 160 of FIG. 1 can be implemented. In certain aspects, the computer system 1700 may be implemented using hardware or a combination of software and hardware, either in a dedicated server, or integrated into another entity, or distributed across multiple entities.

Computer system 1700 includes a bus 1708 or other communication mechanism for communicating information, and a processor 1702 (e.g., an implementation of processor 212, 236, or 266) coupled with bus 1708 for processing information. By way of example, the computer system 1700 may be implemented with one or more processors 1702. Processor 1702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1700 can include, in addition to hardware, code that creates an execution environment for the computer program in question, e.g., code that constitutes processor firmware, a protocol stack, a database management system, an operating system, or a combination of one or more of them stored in an included memory 1704 (e.g., memory 220, 232, or 262), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1708 for storing information and instructions to be executed by processor 1702. The processor 1702 and the memory 1704 can be supplemented by, or incorporated in, special purpose logic circuitry.

The instructions may be stored in the memory 1704 and implemented in one or more computer program products, i.e., one or more modules of computer program instructions encoded on a computer readable medium for execution by, or to control the operation of, the computer system 1700, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1704 may also be used for storing temporary variable or other intermediate information during execution of instructions to be executed by processor 1702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1700 further includes a data storage device 1706 such as a magnetic disk or optical disk, coupled to bus 1708 for storing information and instructions. Computer system 1700 may be coupled via input/output module 1710 to various devices. The input/output module 1710 can be any input/output module. Exemplary input/output modules 1710 include data ports such as USB ports. The input/output module 1710 is configured to connect to a communications module 1712. Exemplary communications modules 1712 (e.g., communications modules 218, 238, and 268) include networking interface cards, such as Ethernet cards and modems. In certain aspects, the input/output module 1710 is configured to connect to a plurality of devices, such as an input device 1714 (e.g., input device 216) and/or an output device 1716 (e.g., output device 214). Exemplary input devices 1714 include a keyboard and a pointing device (e.g., a mouse or a trackball), by which a user can provide input to the computer system 1700. Other kinds of input devices 1714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1716 include display devices, such as a LCD (liquid crystal display) monitor, for displaying information to the user.

According to one aspect of the present disclosure, user device 110, image servers 130, client servers 140 and/or third-party server 160 can be implemented using a computer system 1700 in response to processor 1702 executing one or more sequences of one or more instructions contained in memory 1704. Such instructions may be read into memory 1704 from another machine-readable medium, such as data storage device 1706. Execution of the sequences of instructions contained in main memory 1704 causes processor 1702 to perform the process steps described herein. One or more processors in a multi-processing arrangement may also be employed to execute the sequences of instructions contained in memory 1704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component (e.g., as a data server), or that includes a middleware component (e.g., an application server), or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication (e.g., a communication network). The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1700 can include clients and servers. A client and server are generally remote from each other and typically interact through a communication network. The relationship of client and server arises by virtue of computer programs running on the respective computers and having a client-server relationship to each other. Computer system 1700 can be, for example, and without limitation, a desktop computer, laptop computer, or tablet computer. Computer system 1700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 1702 for execution. Such a medium may take many forms, including, but not limited to, non-volatile media, volatile media, and transmission media. Non-volatile media include, for example, optical or magnetic disks, such as data storage device 1706. Volatile media include dynamic memory, such as memory 1704. Transmission media include coaxial cables, copper wire, and fiber optics, including the wires that comprise bus 1708. Common forms of machine-readable media include, for example, a floppy disk, a flexible disk, a hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
receiving, from a user device, an image request for an image that is associated with an engagement metric of a client that is unassociated with the user device;
identifying, with a machine-learning engine and based on the engagement metric of the client and on an interaction data associated with a previous presentation to multiple users of a plurality of images stored in an image database, a selected image from a plurality of images stored in an image database;
providing the selected image to the user device;
causing an application in the user device to display the selected image, wherein the engagement metric comprises a purchase history of the client, and identifying the selected image comprises biasing a computational node in the machine-learning engine according to the engagement metric;
requesting, from a camera in the user device, an image of a user's face looking at the selected image; and
updating the engagement metric and the interaction data based on where the user is looking and a user's expression in the image of the user's face.

2. The computer-implemented method of claim 1, wherein the image request comprises information associated with an image link previously provided to a client server of the client.

3. The computer-implemented method of claim 1, wherein the engagement metric includes one or more metrics selected from the group consisting of: increasing a time a user device displays a web page associated with the client, causing a customer to click on a specific location on the web page associated with the client, causing the customer to click a purchase option on the web page associated with the client, causing the customer to provide customer information to the client, causing the customer to view an advertisement, and causing the customer to click on the advertisement.

4. The computer-implemented method of claim 1, further comprising receiving the engagement metric from the client prior to receiving the image request from the user device.

5. The computer-implemented method of claim 1, further comprising:
responsive to the image request, obtaining information associated with a user of the user device from a third party,
wherein identifying the selected image comprises identifying the selected image with the machine-learning engine and based on the engagement metric of the client and the information associated with the user.

6. The computer-implemented method of claim 2, wherein the image link comprises an image link for obtaining the image for inclusion in a digital media of the client.

7. The computer-implemented method of claim 2, further comprising receiving information associated with the user device with a tracking element that was previously provided to the client server of the client.

8. The computer-implemented method of claim 6, wherein the digital media of the client comprises a web page, an email, a digital flyer, or a user interface of an application.

9. The computer-implemented method of claim 7, wherein identifying the selected image comprises identifying the selected image with the machine-learning engine and based on the engagement metric of the client and the information associated with the user device.

10. The computer-implemented method of claim 7, wherein the information associated with the user device comprises engagement information, provided from the client server using the tracking element, indicating engagement at the user device with the selected image.

11. The computer-implemented method of claim 9, wherein the information associated with the user device comprises a location of the user device.

12. The computer-implemented method of claim 9, wherein the information associated with the user device comprises information associated with a user of the user device.

13. The computer-implemented method of claim 10, further comprising providing the selected image, the engagement metric, and the information indicating the engagement at the user device with the selected image, as training data to the machine-learning engine.

14. A computer-implemented method, comprising:
storing, in an image database, a plurality of images;
receiving a request from a client server for an image performance unit;
receiving one or more engagement metrics for the image performance unit from the client server;
generating an image link for the image performance unit;
generating a code snippet to provide the one or more engagement metrics to a machine-learning engine having access to information associated with the plurality of images, responsive to an engagement with the image link that comprises an interaction data associated with a previous presentation to multiple users of the plurality of images stored in an image database;
providing the image performance unit including the image link to the client server;
causing an application in a user device to display an image in the image link, wherein the engagement metric comprises a purchase history of a user, and generating a code snippet comprises biasing a computational node in the machine-learning engine according to the purchase history of the user;
receiving, from a camera in the user device, an image of a user's face looking at the image; and
updating the engagement metric and the interaction data based on where the user is looking and a user's expression in the image of the user's face.

15. The computer-implemented method of claim 14, further comprising:
- receiving an indication of an engagement, at a user device, with the image link;
- providing, responsive to the indication and using the code snippet, the one or more engagement metrics to the machine-learning engine;
- identifying, with the machine-learning engine and based on the one or more engagement metrics, a selected image from the plurality of images; and
- providing the selected image to the user device.

16. The computer-implemented method of claim 14, further comprising:
- receiving client information from the client server,
- wherein generating the code snippet to provide the one or more engagement metrics to the machine-learning engine having access to information associated with the plurality of images, responsive to the engagement with the image link, comprises generating the code snippet to provide the one or more engagement metrics and the client information to the machine-learning engine having access to information associated with the plurality of images.

17. The computer-implemented method of claim 14, wherein the one or more engagement metrics include one or more metrics selected from the group consisting of: increasing a time a user device displays a web page associated with the client server, causing a customer to click on a specific location on the web page associated with the client server, causing the customer to click a purchase option on the web page associated with the client server, causing a customer to provide customer information to the client server, causing the customer to view an advertisement, and causing the customer to click on the advertisement.

18. The computer-implemented method of claim 15, further comprising:
- generating a tracking element for the image performance unit,
- wherein providing the image performance unit including the image link to the client server comprises providing the image performance unit including the image link and the tracking element to the client server.

19. The computer-implemented method of claim 18, further comprising receiving engagement information associated with activity at the user device from the client server using the tracking element.

20. A computer-implemented method, comprising:
- providing, from an image server having an image database storing a plurality of images, an image link for inclusion in an advertisement of a client;
- receiving, at the image server, an image request for an image associated with the image link;
- identifying, with a machine-learning engine at the image server and based on an engagement metric of the client and on an interaction data associated with a previous presentation to multiple users of a plurality of images stored in an image database, a selected image for the advertisement from the plurality of images;
- providing the selected image, wherein the engagement metric comprises a purchase history of the client, and identifying the selected image comprises biasing a computational node in the machine-learning engine according to a purchase history of the client;
- causing an application in a user device to display the selected image;
- receiving, from a camera in the user device, an image of a user's face looking at the selected image; and
- updating the engagement metric and the interaction data based on where the user is looking and a user's expression in the image of the user's face.

21. The computer-implemented method of claim 20, wherein providing the image link comprises providing the image link to an advertisement server for inclusion in the advertisement.

22. The computer-implemented method of claim 20, wherein receiving the image request comprises receiving the image request from an advertisement server, and wherein providing the selected image comprises providing the selected image to the advertisement server.

23. The computer-implemented method of claim 20, wherein receiving the image request comprises receiving the image request from a user device that is rendering the advertisement, and wherein providing the image comprises providing the image to the user device.

24. The computer-implemented method of claim 20, wherein providing the image link comprises providing the image link to a client server of the client.

\* \* \* \* \*